(12) United States Patent
Kumazaki et al.

(10) Patent No.: US 10,543,831 B2
(45) Date of Patent: Jan. 28, 2020

(54) VEHICLE CONTROL APPARATUS

(71) Applicant: TOYOTA JIDOSHA KABUSHIKI KAISHA, Toyota-shi, Aichi (JP)

(72) Inventors: Kenta Kumazaki, Anjo (JP); Hiromichi Kimura, Okazaki (JP); Kazuyuki Shiiba, Miyoshi (JP); Tooru Matsubara, Toyota (JP); Takeshi Kitahata, Toyota (JP); Nobufusa Kobayashi, Anjo (JP); Masato Yoshikawa, Toyota (JP); Masayuki Baba, Toyota (JP); Shun Sato, Toyota (JP); Takahiro Kawaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/997,220

(22) Filed: Jun. 4, 2018

(65) Prior Publication Data
US 2018/0354495 A1 Dec. 13, 2018

(30) Foreign Application Priority Data

Jun. 9, 2017 (JP) .................................. 2017-114750

(51) Int. Cl.
*B60W 30/00* (2006.01)
*B60W 20/30* (2016.01)
(Continued)

(52) U.S. Cl.
CPC ............... *B60W 20/30* (2013.01); *B60K 6/26* (2013.01); *B60K 6/40* (2013.01); *B60K 6/547* (2013.01);
(Continued)

(58) Field of Classification Search
None
See application file for complete search history.

(56) References Cited

U.S. PATENT DOCUMENTS

| 2006/0064225 A1* | 3/2006 | Tabata | B60K 6/48 701/96 |
| 2008/0208422 A1* | 8/2008 | Shibata | B60K 6/365 701/54 |
| 2009/0312142 A1* | 12/2009 | Minamikawa | B60W 30/18136 477/5 |
| 2012/0004064 A1* | 1/2012 | Kumazaki | B60L 50/16 475/84 |

(Continued)

FOREIGN PATENT DOCUMENTS

| JP | 2011-199959 A | 10/2011 |
| JP | 2017-112666 A | 6/2017 |

*Primary Examiner* — Jonathan M Dager
(74) *Attorney, Agent, or Firm* — Oliff PLC

(57) ABSTRACT

A control apparatus for a vehicle provided with a motor/generator functioning as a drive power source, and a mechanically operated transmission mechanism which constitutes a part of a power transmitting path between the motor/generator and drive wheels, the control apparatus including a motor/generator control portion configured to implement a regenerative torque control of the motor/generator so as to generate a regenerative torque according to a braking operation by an operator of the vehicle in a decelerating run of the vehicle, and a transmission shifting control portion configured to initiate a shift-down action of the mechanically operated transmission mechanism after a rate of change of the regenerative torque has been held within a predetermined range for at least a predetermined length of time, where a determination to implement the shift-down action is made in the process of the regenerative torque control of the motor/generator according to the braking operation.

7 Claims, 10 Drawing Sheets

(51) Int. Cl.
*F16H 61/02* (2006.01)
*B60L 7/10* (2006.01)
*B60K 6/547* (2007.10)
*B60K 6/26* (2007.10)
*B60K 6/40* (2007.10)
*B60L 15/20* (2006.01)
*B60L 7/18* (2006.01)
*F16H 61/68* (2006.01)

(52) U.S. Cl.
CPC .............. B60L 7/10 (2013.01); B60L 7/18 (2013.01); B60L 15/2009 (2013.01); B60L 15/2054 (2013.01); F16H 61/0204 (2013.01); *B60L 2240/12* (2013.01); *B60L 2240/423* (2013.01); *B60L 2240/486* (2013.01); *B60W 2540/12* (2013.01); *B60W 2710/1005* (2013.01); *B60Y 2200/92* (2013.01); *B60Y 2300/18125* (2013.01); *B60Y 2300/70* (2013.01); *F16H 61/68* (2013.01); *Y10S 903/906* (2013.01); *Y10S 903/919* (2013.01); *Y10S 903/951* (2013.01)

(56) References Cited

U.S. PATENT DOCUMENTS

| | | | | |
|---|---|---|---|---|
| 2012/0022737 A1* | 1/2012 | Kumazaki | ............... | B60L 50/61 701/22 |
| 2012/0053769 A1* | 3/2012 | Kumazaki | ............. | B60K 6/445 701/22 |
| 2012/0072065 A1* | 3/2012 | Minamikawa | ......... | B60K 6/445 701/22 |
| 2012/0077638 A1* | 3/2012 | Kumazaki | ............. | B60K 6/445 477/5 |
| 2012/0103749 A1* | 5/2012 | Kimura | ................ | B60W 30/20 192/54.1 |
| 2013/0210575 A1* | 8/2013 | Kumazaki | ................ | B60K 6/48 477/20 |
| 2014/0148985 A1* | 5/2014 | Sato | ...................... | B60W 20/00 701/22 |
| 2017/0166194 A1* | 6/2017 | Kumazaki | ............. | B60W 10/06 |
| 2017/0197628 A1* | 7/2017 | Nefcy | ...................... | B60K 6/36 |
| 2018/0099580 A1* | 4/2018 | Kumazaki | ............. | B60K 6/365 |
| 2018/0106367 A1* | 4/2018 | Mouri | ................... | B60W 20/30 |
| 2019/0039450 A1* | 2/2019 | Baba | ..................... | B60K 6/547 |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2017-114750 filed on Jun. 9, 2017, the disclosure of which is herein incorporated by reference in its entirety.

FIELD OF THE INVENTION

The present invention relates to a control apparatus for a vehicle provided with a motor/generator and a mechanically operated transmission mechanism through which a drive force of the motor/generator is transmitted.

BACKGROUND OF THE INVENTION

There is well known a control apparatus for a vehicle provided with a motor/generator functioning as a drive power source, and a mechanically operated transmission mechanism which constitutes a part of a power transmitting path between the motor/generator and drive wheels. A control apparatus disclosed in JP-2011-199959A is an example of this type of vehicular control apparatus. This document discloses a technique for restricting an increase of a regenerative torque of the motor/generator until a shift-down action of the transmission mechanism is completed, when a vehicle braking operation is performed during the shift-down action implemented as a result of reduction of the running speed of the vehicle in a coasting regenerative run of the vehicle (namely, during a regenerative operation of the motor/generator in the coasting run of the vehicle).

By the way, the regenerative torque generated by the motor/generator in a decelerating run of the vehicle is controlled to be larger when a braking operation is performed by the vehicle operator than when the braking operation is not performed, or so as to increase with an increase of an amount of the braking operation. Accordingly, an inertia in an input inertia system of the mechanically operated transmission mechanism including the motor/generator is increased with an increase of the regenerative torque of the motor/generator when the braking operation is performed by the vehicle operator (when an amount of operation of a brake pedal by the vehicle operator is increased) during a shift-down action of the mechanically operated transmission mechanism in the process of a regenerative torque control, so that a length of time until the shift-down action is completed is prolonged. If an operating speed of an actuator for the shift-down action is increased for reducing the required length of time for completion of the shift-down action, an output torque of the mechanically operated transmission mechanism varies by an amount that can be felt by the vehicle operator, so that drivability of the vehicle may be deteriorated. To deal with this problem in the control apparatus of JP-2011-199959A, it is considered to restrict the increase of the regenerative torque during the shift-down action in the process of the regenerative torque control. In this case, however, the increase of the regenerative torque is restricted also when the amount of braking operation is increased, so that an amount of electric energy that would be normally generated with the regenerative torque is not obtained. The reduction of the amount of generation of electric energy as a result of reduction of the amount of generation of the regenerative energy is not favorable for improvement of fuel economy of the vehicle.

SUMMARY OF THE INVENTION

The present invention was made in view of the background art described above. It is therefore an object of the present invention to provide a control apparatus for a vehicle, which permits an improvement of fuel economy of the vehicle while reducing a risk of deterioration of drivability of the vehicle, in the process of an increase of a regenerative torque of a motor/generator due to a vehicle braking operation during a shift-down action of a mechanically operated transmission mechanism in a decelerating run of the vehicle.

The object indicated above is achieved according to the following modes of the present invention:

According to a first mode of the invention, there is provided a control apparatus for a vehicle provided with a motor/generator functioning as a drive power source, and a mechanically operated transmission mechanism which constitutes a part of a power transmitting path between the motor/generator and drive wheels, the control apparatus comprising: a motor/generator control portion configured to implement a regenerative torque control of the motor/generator so as to generate a regenerative torque according to a braking operation by an operator of the vehicle in a decelerating run of the vehicle; and a transmission shifting control portion configured to initiate a shift-down action of the mechanically operated transmission mechanism after a rate of change of the regenerative torque has been held within a predetermined range for at least a predetermined length of time, where a determination to implement the shift-down action is made in the process of the regenerative torque control of the motor/generator according to the braking operation.

According to a second mode of the invention, the control apparatus according to the first mode of the invention is configured such that the transmission shifting control portion initiates the shift-down action of the mechanically operated transmission mechanism, when a running speed of the vehicle has been lowered to or below a predetermined lower limit, even before the rate of change of the regenerative torque has been held within the predetermined range for at least the predetermined length of time.

According to a third mode of the invention, the control apparatus according to the first or second mode of the invention is configured such that the regenerative torque of the motor/generator is a required value of the regenerative torque which increases with an increase of an amount of the braking operation by the operator of the vehicle, and the rate of change of the regenerative torque is a rate of change of the required value of the regenerative torque.

According to a fourth mode of the invention, the control apparatus according to any one of the first through third modes of the invention is configured such that the mechanically operated transmission mechanism is a step-variable automatic transmission which is shifted to a selected one of a plurality of speed positions with an engaging action of a selected one of a plurality of coupling devices.

According to a fifth mode of the invention, the control apparatus according to the fourth mode of the invention is configured such that the predetermined range of the rate of change of the regenerative torque of the motor/generator is predetermined for each of the speed positions of the step-variable automatic transmission.

According to a sixth mode of the invention, the control apparatus according to any one of the first through fifth modes of the invention is configured such that the vehicle is further provided with an engine also functioning as the drive power source, and an electrically controlled transmission mechanism having a differential mechanism to which the engine is operatively connected in a power transmittable manner, and a first motor/generator operatively connected to the differential mechanism in a power transmittable manner, a differential state of the differential mechanism being controlled by controlling an operating state of the first motor/generator, and the motor/generator generating the regenerative torque is a second motor/generator operatively connected to an output rotary member of the electrically controlled transmission mechanism in a power transmittable manner.

The control apparatus according to the first mode of the invention is configured to initiate the shift-down action of the mechanically operated transmission mechanism after the rate of change of the regenerative torque has been held within the predetermined range for at least the predetermined length of time, where the determination to implement the shift-down action is made in the process of the regenerative torque control of the motor/generator according to the braking operation. Namely, the present control apparatus is configured such that the implementation of the shift-down action is delayed until the rate of change of the regenerative torque has been held within the predetermined range for at least the predetermined length of time. Accordingly, it is possible to increase an amount of a regenerated electric energy, while restricting an increase of the regenerative torque to reduce a risk of deterioration of drivability of the vehicle as a result of the shift-down action implemented in the process of the regenerative torque control. The present control apparatus is further configured to implement the shift-down action while the rate of change of the regenerative torque is held stably constant at a low value. In this respect, it is noted that the rate of change of the regenerative torque may fall within the predetermined range due to a relatively long length of time between unstable intermittent operations of a brake operating member by the vehicle operator to increase the vehicle braking torque in a stepping manner. If the shift-down action is implemented in this case, the regenerative torque is increased as a result of the subsequent operation of the brake operating member to increase the vehicle braking torque in the process of the shift-down action, giving rise to a risk of an increase of the required time for completion of the shift-down action, and a risk of deterioration of drivability of the vehicle due to fluctuation of the vehicle braking torque. The present control apparatus is configured to initiate the shift-down action only after the rate of change of the regenerative torque has been held within the predetermined range for at least the predetermined length of time, that is, after a possibility of the subsequent operation of the brake operating member to increase the vehicle braking torque has been reduced. Accordingly, the shift-down action is implemented while the rate of change of the regenerative torque is held stably constant at a low value. In other words, if the increase of the regenerative torque is restricted to reduce the risk of deterioration of drivability of the vehicle where the shift-down action is initiated after the brake operating member is not operated for a relatively long length of time between the unstable intermittent operations, the increase of the regenerative torque is restricted when the brake operating member is subsequently operated to increase the vehicle braking torque. In the first mode of the invention, the implementation of the shift-down action is delayed until the rate of change of the regenerative torque has been held within the predetermined range for at least the predetermined length of time, so that the regenerative torque is increased when the brake operating member is subsequently operated to increase the vehicle braking torque. Accordingly, the present control apparatus permits an improvement of fuel economy of the vehicle while reducing the risk of deterioration of drivability of the vehicle in the process of an increase of the regenerative torque due to an operation of the brake operating member during the shift-down action of the mechanically operated transmission mechanism in the decelerating run of the vehicle.

According to the second mode of the invention, the shift-down action of the mechanically operated transmission mechanism is initiated when the running speed of the vehicle is lowered to or below the predetermined lower limit, even before the rate of change of the regenerative torque has been held within the predetermined range for at least the predetermined length of time. If the implementation of the shift-down action is delayed until the rate of change of the regenerative torque has been held within the predetermined range for at least the predetermined length of time, the shift-down action is initiated at the vehicle running speed lower than a value at which the determination to implement the shift-down action is made, so that there is a risk of aggravation of the shift-down shock. In view of this risk, the shift-down action is implemented before the vehicle running speed is lowered to or below the lower limit below which the shift-down shock is aggravated.

According to the third mode of the invention, the regenerative torque of the motor/generator is the required value of the regenerative torque which increases with an increase of the amount of the braking operation, and the rate of change of the regenerative torque is the rate of change of the required value of the regenerative torque. Accordingly, the implementation of the shift-down action of the mechanically operated transmission mechanism is delayed in the process of an increase of a required value of the regenerative torque while the rate of change of the required value of the regenerative torque is not held within the predetermined range. Accordingly, it is possible to increase the regenerated electric energy with an increase of an actual value of the regenerative torque as a result of the increase of the required value of the regenerative torque.

According to the fourth mode of the invention wherein the mechanically operated transmission mechanism is the step-variable automatic transmission which is shifted to a selected one of its plurality of speed positions with the engaging action of a selected one of its plurality of coupling devices, the control apparatus is configured to initiate the shift-down action of the step-variable automatic transmission after the regenerative torque change rate has been held within the predetermined range for at least the predetermined length of time. Accordingly, the shift-down action is implemented while the regenerative torque change rate is held stably constant at a low value, so that it is possible to reduce the risk of deterioration of drivability of the vehicle due to delayed concurrent engaging and releasing actions of the coupling devices to shift-down the step-variable automatic transmission in the process of an increase of the regenerative torque as a result of intermittent operations of the brake operating member to increase the vehicle braking torque in the stepping manner.

According to the fifth mode of the invention, the above-indicated range of the regenerative torque change rate is predetermined for each of the speed positions of the step-variable automatic transmission. Accordingly, the shift-down actions of the step-variable automatic transmission to the respective speed positions are implemented so as to appropriately reduce the risk of deterioration of drivability of the vehicle, irrespective of different degrees of deterioration of the drivability when the step-variable automatic transmission is shifted down to the respective speed positions. Therefore, it is possible to reduce a possibility of delayed completion of a shift-down action due to delayed initiation of the shift-down action in spite of a relatively low degree of risk of deterioration of the drivability due to implementation of that shift-down action, or a possibility of increased deterioration of the drivability due to a shift-down action initiated in spite of a relatively high degree of risk of deterioration of the drivability due to implementation of that shift-down action.

The control apparatus according to the sixth mode of the invention is configured to control the vehicle provided with the electrically controlled transmission mechanism and the mechanically operated transmission mechanism which are connected in series to each other. The present control apparatus permits an improvement of fuel economy of the vehicle while reducing a risk of deterioration of drivability of the vehicle, in the process of an increase of a regenerative torque of the second motor/generator due to a vehicle braking operation during a shift-down action of the mechanically operated transmission mechanism in a decelerating run of the vehicle.

DETAILED DESCRIPTION OF INVENTION

Figure 1:
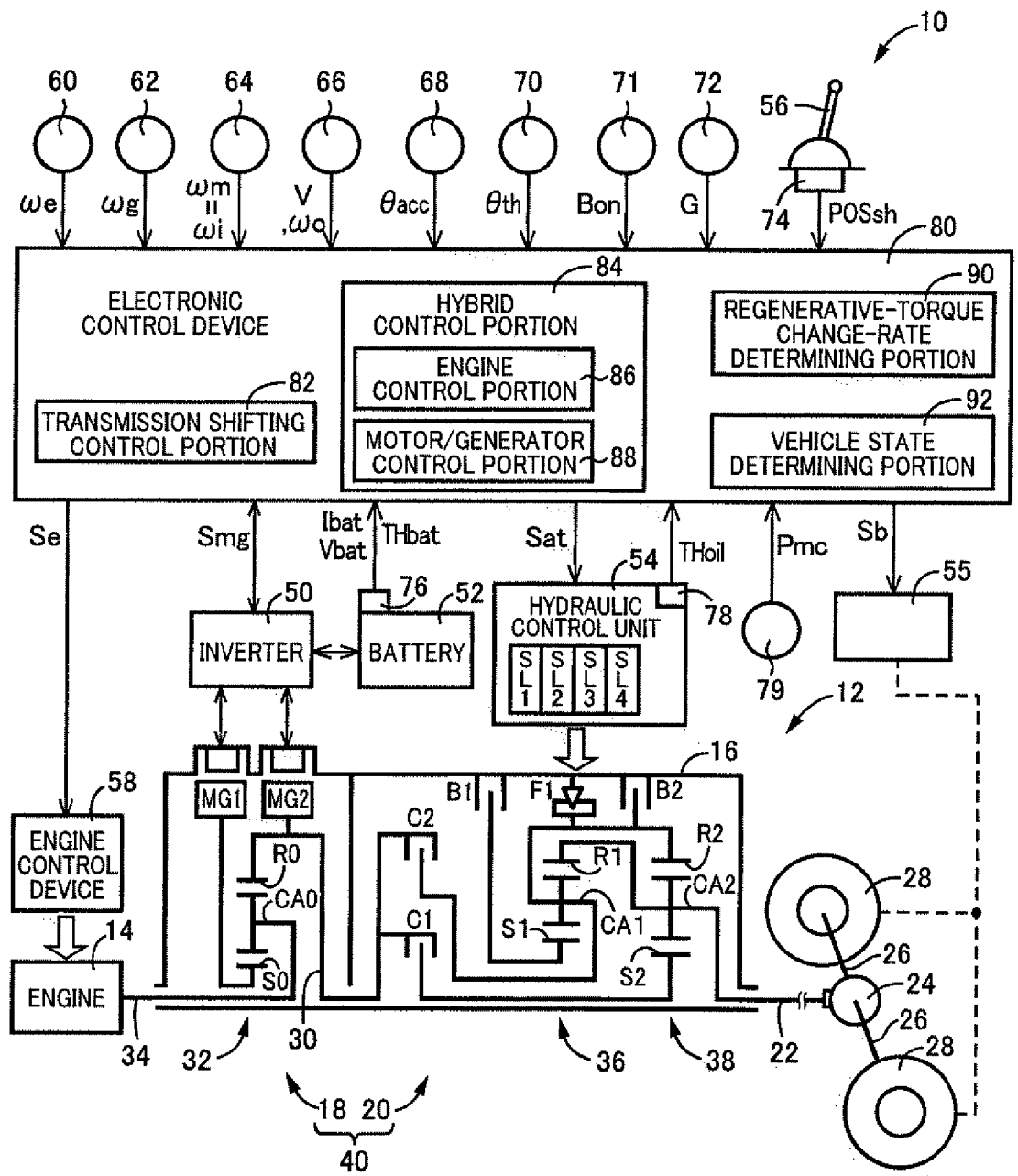
FIG. 1 is a schematic view showing an arrangement of a vehicular drive system to be controlled by a control apparatus according to the present invention, and major control functions and control portions of the control apparatus.

In the following embodiments of the invention, the rate of change of the regenerative torque may be a rate of change of the above-indicated actual value of the regenerative torque. In this case, the implementation of the shift-down action of the mechanically operated transmission mechanism is delayed while the actual value of the regenerative torque is increased at a rate outside a predetermined range. Accordingly, the amount of the regenerated electric energy can be increased by an increase of the actual value of the regenerative torque.

The rate of change of the regenerative torque may be a rate of change of a required braking torque, where an entirety of the required braking torque according to the braking operation is provided by the regenerative torque.

The predetermined range of the rate of change of the regenerative torque may be determined on the basis of the temperature of a working fluid used to operate the above-described coupling devices; the temperature of the motor/generator; restrictions regarding an electric power storage device to and from which electric power is respectively supplied from and to the motor/generator, for example, maximum charging and discharging amounts of electric power; or the operating state of the engine. In this case, the mechanically operated transmission mechanism is shifted down so as to reduce the deterioration of drivability of the vehicle, in view of the degree of the deterioration which varies depending upon the temperature of the working fluid, the temperature of the motor/generator, the restrictions of the electric power storage device, and/or the operating state of the engine.

The predetermined lower limit of the vehicle running speed described above with respect to the second mode of the invention is determined depending upon the speed position to which the above-indicated mechanically operated transmission mechanism is shifted down. Accordingly, the shift-down action is initiated before the vehicle running speed is lowered to the value below which the shift-down shock is aggravated, which value varies depending upon the above-indicated speed position and is lower than a boundary speed value used to make the determination to implement the shift-down action.

The vehicle running speed described above with respect to the second mode of the invention may be represented by the rotating speed of an output rotary member of the mechanically operated transmission mechanism, the rotating speed of the drive wheels, or the rotating speed of a rotary member disposed in a power transmitting path between the output rotary member of the mechanically operated transmission mechanism and the drive wheels.

Referring to the drawings, preferred embodiments of the present invention will be described in detail.

First Embodiment

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20") connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a non-rotatable member fixed to a vehicle body, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te, which is an output torque of this engine 14, is controlled by an electronic control device 80 (described below) which controls the operating condition of the engine 14 as represented by an opening angle θth of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission portion 18; and the second motor/generator MG2 operatively connected to the intermediate power transmitting member 30. The continuously variable transmission portion 18 is an electrically controlled continuously variable transmission wherein a differential state of the differential mechanism 32 is controllable by controlling an operating state of the first motor/generator MG1. The first motor/generator MG1 functions as a differential motor/generator (a differential motor) while the second motor/generator MG2 is a motor/generator (an electric motor) which functions as a drive power source, namely, a vehicle driving motor/generator. The vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a mechanically operated transmission mechanism which constitutes a part of a power transmitting path between the intermediate power transmitting member 30 and the drive wheels 28. The intermediate power transmitting member 30 also functions as an input rotary member of the step-variable transmission portion 20. The step-variable transmission portion 20 is considered to also constitute a part of a power transmitting path between the drive power source (second motor/generator MG2 or engine 14) and the drive wheels 28, since the second motor/generator MG2 is connected to the intermediate power transmitting member 30 such that the intermediate power transmitting member 30 is rotated together with the second motor/generator MG2, or since the engine 14 is connected to an input rotary member of the continuously variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipping or released states with their torque capacities (engaging torque values or CB-transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through an engaging action of the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. It is noted that the engaging torque (CB-transmitted torque) Tcb and the engaging hydraulic pressure PRcb are proportional to each other, after the engaging hydraulic pressure PRcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is a step-variable automatic transmission which is shifted to a selected one of four AT gear positions (speed positions) by engaging actions of selected ones of the coupling devices CB. These four AT gear positions have respective different speed ratios γat (=AT input speed ωi/AT output speed ωo). Namely, the step-variable transmission portion 20 is a step-variable transmission which is shifted up and down from one gear position to another by placing selected ones of the coupling devices CB in the engaged state. The AT input speed ωi is a rotating speed (angular velocity) of the input rotary member of the step-variable transmission portion 20, that is, a rotating speed of the intermediate power transmitting member 30, which is equal to an MG2 speed ωm which is an operating speed of the second motor/generator MG2. Thus, the AT input speed ωi can be represented by the MG2 speed ωm. The AT output speed ωo is a rotating speed of the output shaft 22 of the step-variable transmission portion 20, which is considered to be an output speed of a transmission device 40 which consists of the continuously variable transmission portion 18 and the step-variable transmission portion 20.

Figures 2, 3:
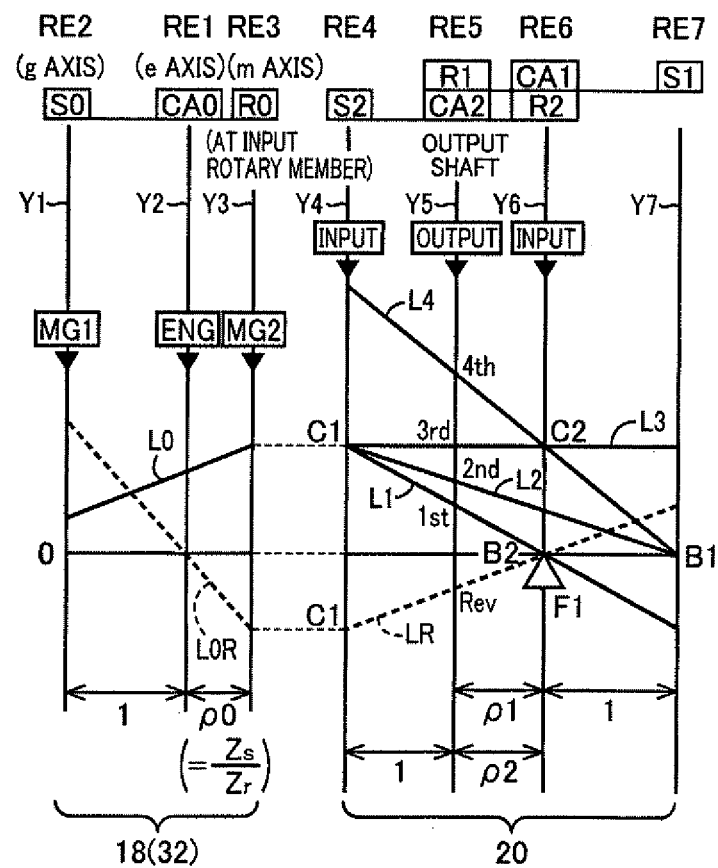
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) "$4^{th}$". In the table, "○" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission portion 20 in the coasting run of the vehicle 10 is a kind of a "power-off shift-down action" which is required as a result of reduction of a vehicle-speed-related value (vehicle running speed V, for example) due to reduction of a required drive force (as represented by an operation amount θacc of an accelerator pedal by a driver (operator) of the vehicle 10) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission portion 20. The above-indicated one coupling device CB was placed in the engaged state before the step-variable transmission portion 20 is shifted to establish the newly selected AT gear position, while the above-indicated another coupling device CB is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "$2^{nd}$" to the first speed AT gear position "$1^{st}$", with the releasing action of the brake B1 and the concurrent engaging action of the brake B2, as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates a relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio $\rho 0$ of the differential mechanism 32, while the distances between the adjacent ones of the vertical lines Y4-Y7 are determined by gear ratios $\rho 1$ and $\rho 2$ of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio $\rho$ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, straight lines L0 and L0R intersecting the vertical line Y2 represent a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3, L4 and LR intersecting the vertical line Y5 represent the rotating speeds of the output shaft 22 in the respective first, second, third, fourth speed and reverse drive AT gear positions "$1^{st}$", "$2^{nd}$", "$3^{rd}$", "$4^{th}$" and "Rev" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td ($=Te/(1+\rho)$ $=-(1/\rho)*Tg$) which is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed ωe of the engine 14 (engine speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions.

Broken straight lines L0R and LR shown in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the step-variable transmission portion 20 placed in the first speed AT gear position. To drive the vehicle 10 in the rearward direction, the electronic control device 80 described below is configured to command the second motor/generator MG2 to generate the reverse driving MG2 torque Tm (negative reverse driving torque) opposite to the forward driving MG2 torque Tm (positive forward driving torque), while the step-variable transmission portion 20 is placed in a low-speed AT gear position (first speed AT gear position, for example). Thus, the vehicle 10 is driven in the rearward direction with the reverse (negative) MG2 torque Tm while the step-variable transmission portion 20 is placed in one of the forward driving AT gear positions. In the hybrid drive mode, too, the second motor/generator MG2 can be operated in the negative direction as indicated by the straight line L0R, so that the vehicle 10 can be driven in the rearward direction in the hybrid drive mode, as well as in the motor drive mode.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, the second motor/generator MG2) is operatively connected. Namely, the continuously variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio $\gamma 0$ ($=\omega e/\omega m$) of which is variable. The speed ratio $\gamma 0$ is a ratio of rotating speed of the connecting shaft 34 (namely, engine speed $\omega e$) to the rotating speed of the intermediate power transmitting member 30 (namely, MG2 speed $\omega m$).

In the hybrid drive mode, for instance, the rotating speed of the sun gear S0 is raised or lowered by controlling an operating speed of the first motor/generator MG1 while the rotating speed of the ring gear R0 is determined by the rotating speed of the drive wheels 28 with the step-variable transmission portion 20 placed in one of the AT gear positions, so that the rotating speed of the carrier CA0 (namely, engine speed $\omega e$) is accordingly raised or lowered. In running with operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 in which the continuously variable transmission portion 18 (differential mechanism 32) and the step-variable transmission portion 20 are disposed in series with each other and which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" although it may be referred also to as "conceptual speed positions") having respective different values of a speed ratio $\gamma t$ ($=\omega e/\omega o$) which is a ratio of the engine speed $\omega e$ to the output speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t=\gamma 0*\gamma at$.

Figures 4, 5:
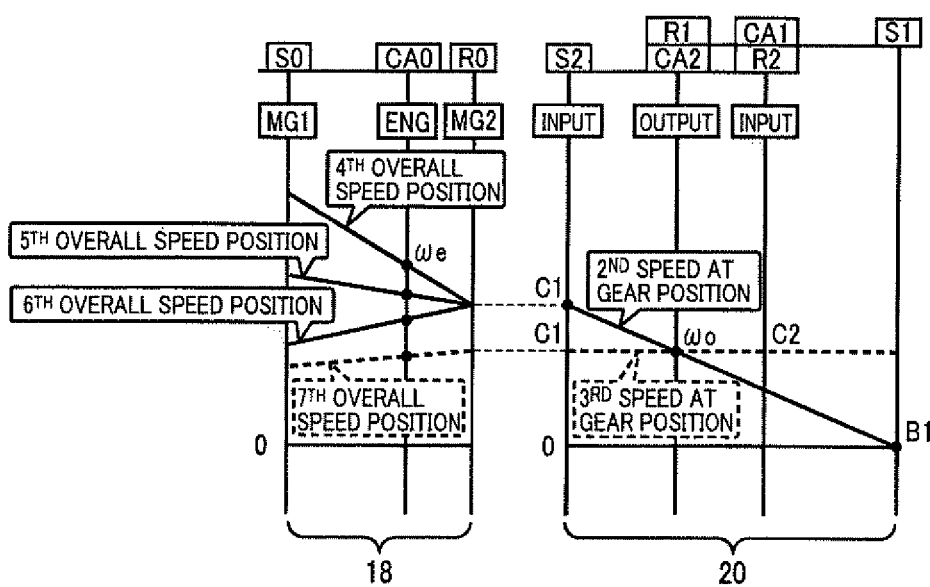
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein the first through third overall speed positions are established for the first speed AT gear position, the fourth through sixth overall speed positions are established for the second speed AT gear position, the seventh through ninth overall speed positions are established for the third speed AT gear position, and the tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously variable transmission portion 18 is controlled to control the engine speed $\omega e$ with respect to the output speed $\omega o$ for establishing the predetermined overall speed ratio values $\gamma t$, to thereby establish the different overall speed position or positions for each of the AT gear positions. A broken line indicates the seventh overall speed position established when the step-variable transmission portion 20 is placed in the third speed AT gear position. In the transmission device 40, the continuously variable transmission portion 18 is controlled according to the selected one of the AT gear positions, for shifting the transmission device 40 from one of the overall speed positions to another.

Referring back to FIG. 1, the vehicle 10 is provided with a wheel braking device 55 serving as a braking device for applying a braking torque to the vehicle wheels (drive wheels 28, and driven wheels not shown). The wheel braking device 55 is arranged to apply a hydraulic braking pressure (supply a pressurized braking fluid) to a wheel brake cylinder provided for each of the wheels, according to an operation of a brake operating member (a brake pedal, for example) by the vehicle operator. Normally, the braking fluid is pressurized by a master cylinder of the wheel braking device 55 to generate master cylinder pressure (pressure of brake fluid) Pmc corresponding to an operating force acting on the brake pedal, so that the master cylinder pressure Pmc is applied as the hydraulic braking pressure directly to the wheel brake cylinders. On the other hand, the wheel braking device 50 is controlled to apply to the wheel brake cylinders the hydraulic braking pressure not corresponding to the operating force of the brake pedal, such that the hydraulic braking pressure is suitably regulated to implement various braking controls such as: a cooperative braking control in a decelerating run of the vehicle 10, in which a total braking force required to be applied to the vehicle 10 is controlled to be equal to a sum of the hydraulic braking force generated by the wheel brake cylinders and a regenerative braking force; an ABS control (anti-lock braking control) in which the hydraulic braking pressure is controlled so as to prevent locking of the wheels on a roadway surface having a relatively low friction coefficient $\mu$; a traction control in which the hydraulic braking pressure is controlled to adjust a traction force for starting the vehicle 10; a VSC control (vehicle stability control) for improved stability of turning or cornering of the vehicle 10; and a hill-hold braking control for stable stopping of the vehicle 10 on an uphill or downhill roadway.

The vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals from various sensors provided on the vehicle 10, such as: an output signal of an engine speed sensor 60 indicative of the engine speed $\omega e$; an output signal of an MG1 speed sensor 62 indicative of the MG1 speed $\omega g$ which is the operating speed of the first motor/generator MG1; an output signal of an MG2 speed sensor 64 indicative of the MG2 speed $\omega m$ which is the AT input speed $\omega i$; an output signal of an output speed sensor 66 indicative of the output speed $\omega o$ corresponding to the vehicle running speed V, an output signal of an accelerator pedal operation amount sensor 68 indicative of the operation amount $\theta acc$ of a vehicle accelerating member in the form of the accelerator pedal, which operation amount $\theta acc$ represents a degree of acceleration of the vehicle 10 required by the vehicle operator; an output signal of a throttle valve opening angle sensor 70 indicative of an angle $\theta th$ of opening of an electronic throttle valve; an output signal Bon of a brake switch 71 indicative of an operation of the brake pedal by the vehicle operator to actuate the wheel braking device 55; an output signal of an acceleration sensor 72 indicative of a longitudinal acceleration value G of the vehicle 10; an output signal of a shift position sensor 74 indicative of an operating position POSsh of a manually operated shifting member in the form of a shift lever 56 provided on the vehicle 10; an output signal of a battery sensor 76 indicative of a temperature THbat, a charging/discharging electric current Ibat and a voltage Vbat of the battery 52; an output signal of an oil temperature sensor 78 indicative of a temperature THoil of a working fluid used for operating hydraulic actuators of the coupling devices CB; and an output signal of a master cylinder pressure sensor 79 indicative of the master cylinder pressure Pmc generated by the master cylinder of the wheel braking device 55. Further, the electronic control device 80 generates various output signals to the various devices provided on the vehicle 10, such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; hydraulic control command signals Sat to be applied to the hydraulic control unit 54, for controlling the operating states of the coupling devices CB (namely, for controlling the shifting actions of the step-variable transmission portion 20); and a braking control command signal Sb to be applied to the wheel braking device 55 for controlling the wheel braking torques of the wheel brake cylinders. The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current corresponding to the hydraulic pressure command value.

The electronic control device 80 is configured to calculate a charging state (stored electric power amount) SOC (%) of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of a transmission shifting control portion 82, and a hybrid control means or portion in the form of a hybrid control portion 84, for performing various controls of the vehicle 10.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20.

Figure 6:
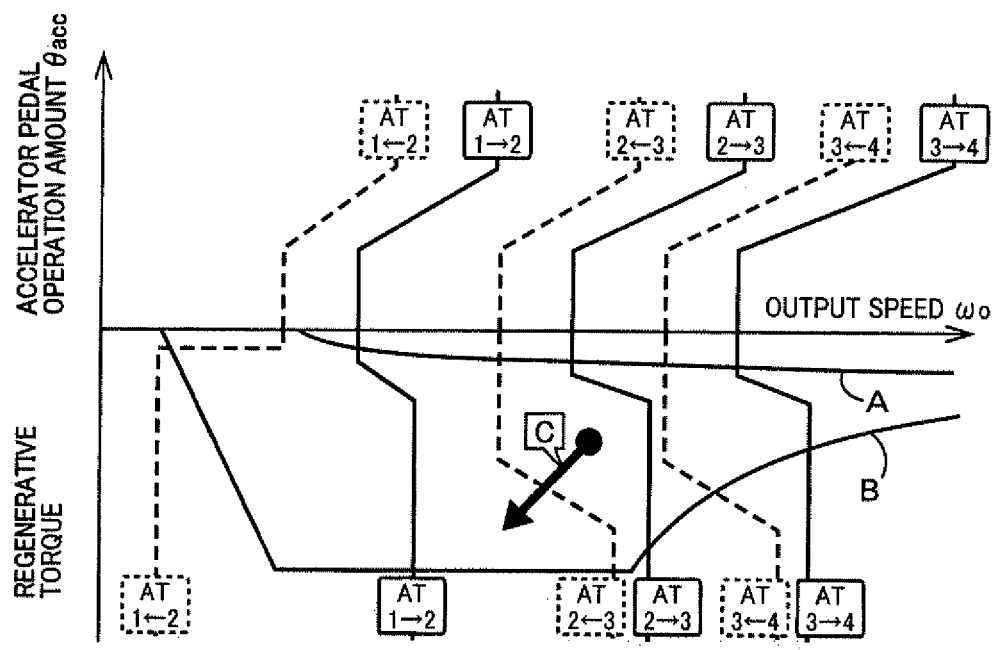
FIG. 6 is a view illustrating an example of an AT gear position shifting map used to shift up and down the mechanically operated step-variable transmission portion.

FIG. 6 is the view illustrating an example of the AT gear position shifting map used to shift up and down the step-variable transmission portion 20. As illustrated in FIG. 6, the AT gear position shifting map used in a driving or accelerating state of the vehicle 10 is a predetermined relationship between two variables in the form of the output speed ωo (equivalent to the vehicle running speed V) and the accelerator pedal operation amount θacc (equivalent to a required drive torque Tdem or the throttle valve opening angle θth), which relationship is used to determine a shifting action of the step-variable transmission portion 20 and is represented by shifting lines in a two-dimensional coordinate system in which the output speed ωo and the accelerator pedal operation amount θacc are taken along respective two axes. On the other hand, the AT gear position shifting map used in a non-driven or decelerating state of the vehicle 10 is a predetermined relationship between two variables in the form of the output speed ωo and the regenerative torque (equivalent to an AT output torque To which is an output torque of the step-variable transmission portion 20), which relationship is used to determine a shifting action of the step-variable transmission portion 20 is represented by shifting lines in a two-dimensional coordinate system in which the output speed ωo and the regenerative torque are taken along respective two axes. The shifting lines in the AT gear position shifting map consist of shift-up lines (indicated by solid lines in FIG. 6) for determining a shift-up action of the step-variable transmission portion 20, and shift-down lines (indicated by broken lines in FIG. 6) for determining a shift-down action of the step-variable transmission portion 20. Each of the shifting lines is defined by a series of shifting points which are determined such that the step-variable transmission portion 20 should be shifted up or down when the output speed ωo becomes higher or lower than the shifting point at a given value of the accelerator pedal operation amount θacc or the regenerative torque, or when the accelerator pedal operation amount θacc or the regenerative torque becomes larger or smaller than the shifting point at a given value of the output speed ωo. It is noted that a solid line A in FIG. 6 represents the regenerative torque generated without an operation of the wheel braking device 55 in a decelerating run of the vehicle 10, while a solid line B in FIG. 6 represents a maximum value of the regenerative torque generated with an operation of the wheel braking device 55 in the decelerating run of the vehicle 10.

The hybrid control portion 84 has a function of an engine control means or portion 86 to control the engine 14, and a function of a motor/generator control means or portion 88 to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command value of an engine power Pe which is a power of the engine 14 outputting the torque Te at its present operating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and an electric power amount Wm to be consumed by the second motor/generator MG2 to generate the MG2 torque Tm at the present MG2 speed ωm.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first motor/generator MG1, so as to establish the engine speed ωe and the engine torque Te for obtaining the engine power Pe to establish the required vehicle drive power Pdem, while taking account of a highest fuel economy point of the engine 14, so that the speed ratio γ0 of the continuously variable transmission portion 18 is controlled so as to be continuously varied. As a result, the speed ratio γt of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine speed ωe according to the output speed ωo so as to maintain the respective speed ratio values γt. It is noted that the speed ratio γt in each of the overall speed positions does not necessarily have to be constant over all ranges of the output speed ωo, but may be changed in a predetermined range or ranges of the output speed ωo or may be given a limitation or limitations, for example, depending on upper and lower limits of rotating speeds of respective rotatable elements.

Figure 7:
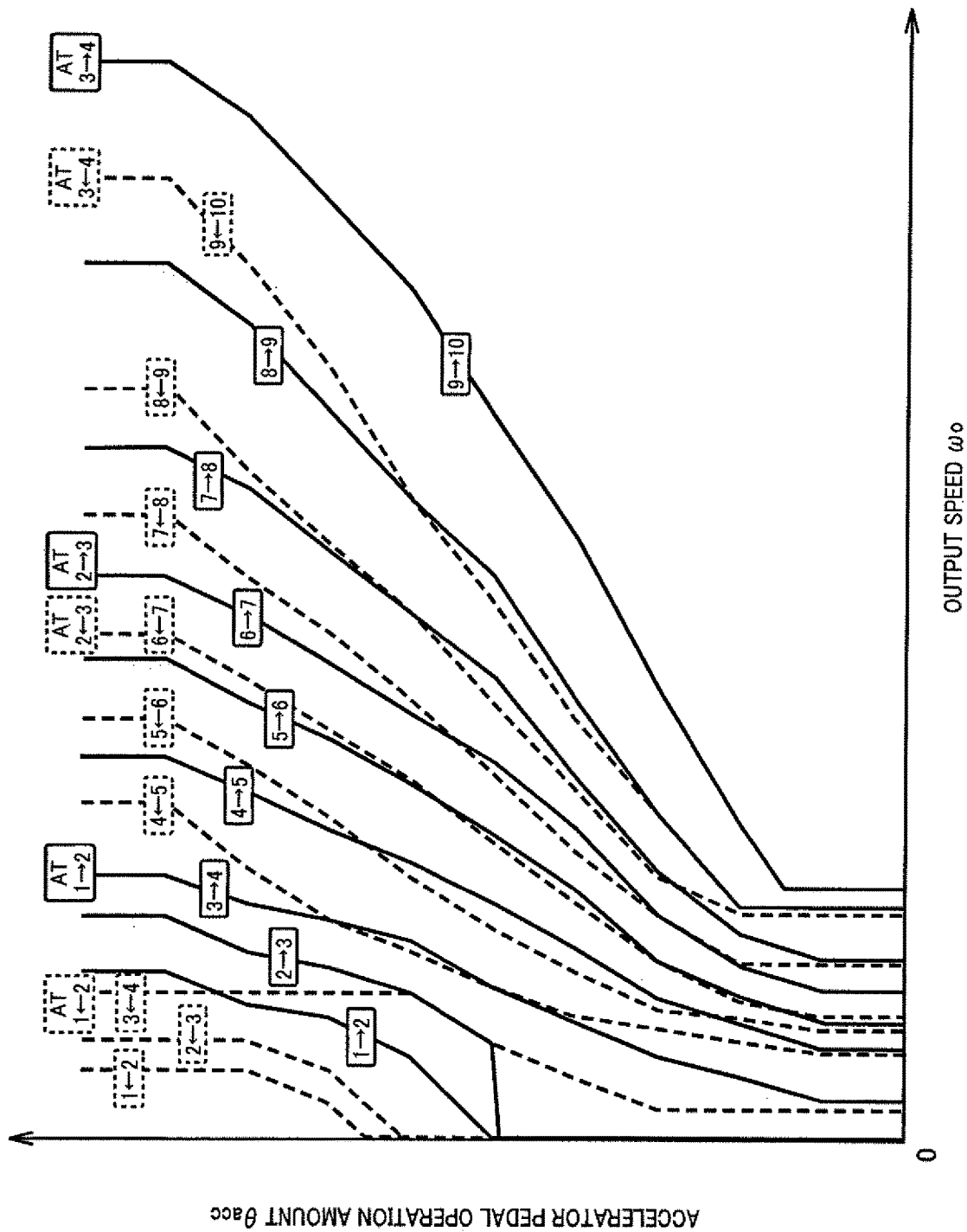
FIG. 7 is a view illustrating an example of an overall speed position shifting map used to shift the transmission device to a selected one of the plurality of overall speed positions.

Like the AT gear position shifting map of FIG. 6, the above-indicated overall speed position shifting map is a relationship between the output speed ωo and the accelerator pedal operation amount θacc as parameters. FIG. 7 is the view illustrating an example of the overall speed position shifting map. In FIG. 7, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. In this respect, reference is made to FIG. 4. Therefore, the AT gear position shifting map of FIG. 6 is formulated so that the AT gear position shifting operation is performed in synchronization with the overall speed position shifting operation. Described more specifically by reference to FIG. 7, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with the shift-up boundary lines for respectively shifting the step-variable transmission portion 20 from the first speed AT gear position to the second speed AT gear position (indicated as "AT1→2" in FIG. 7), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 7), from the third speed AT gear position to the second speed AT gear position, and from the fourth speed AT gear position to the third speed AT gear position.

Alternatively, a command to shift the step-variable transmission portion 20 may be applied to the transmission shifting control portion 82 in response to a determination according to the overall speed position shifting map of FIG. 7 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed ωe, so that the vehicle operator is less likely to uncomfortably recognize a shifting shock of the step-variable transmission portion 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

The hybrid control portion 84, in particular, the motor/generator control portion 88, is configured to implement a regenerative torque control of the second motor/generator MG2, so as to generate a regenerative torque according to an operation of the brake operating member (brake pedal) by the vehicle operator in a decelerating run of the vehicle 10. This regenerative torque control is a control implemented such that the second motor/generator MG2 is operated as an electric generator with a reverse torque transmitted from the drive wheels 28, so that the battery 52 is charged through the inverter 50 with an electric power generated by the second motor/generator MG2.

In the decelerating run of the vehicle. 10, the hybrid control portion 84 determines a target deceleration value Gtgt of the vehicle 10 as a required braking torque, and controls the braking torque of the vehicle 10 so as to obtain the target vehicle deceleration value Gtgt. The hybrid control portion 84 calculates the target vehicle deceleration value Gtgt on the basis of the master cylinder pressure Pmc, and according to a predetermined relationship between the target vehicle deceleration value Gtgt and the master cylinder pressure Pmc, which relationship is formulated such that the target vehicle deceleration value Gtgt increases with an increase of the master cylinder pressure Pmc corresponding to an amount of operation of the brake operating member by the vehicle operator. For instance, the overall braking torque of the vehicle 10 is a sum of the regenerative torque, an engine braking torque and the wheel braking torque generated by the wheel braking device 55. For maximizing energy efficiency, generation of the regenerative torque by the second motor/generator MG2 is given the highest priority in the control of the overall braking torque. Where the required braking torque of the vehicle 10 is comparatively small, for example, the regenerative torque is initially primarily generated by the second motor/generator MG2, and the wheel braking torque is generated by the wheel braking device 55, in place of the regenerative torque, immediately before the vehicle 10 is brought into a complete stop (into a stationary state). Where the required braking torque of the vehicle 10 is comparatively large, the wheel braking torque is added to the regenerative torque, and, the regenerative torque is increased with a decrease of the running speed V of the vehicle 10, and the wheel braking torque is generated in place of the regenerative torque, immediately before the vehicle 10 is brought into the complete stop. The hybrid control portion 84 calculates a required value of the regenerative torque to obtain the target vehicle deceleration value Gtgt, according to a predetermined relationship. This required value of the regenerative torque increases with an increase of the amount of operation of the brake operating member by the vehicle operator. The motor/generator control portion 88 controls the regenerative operation of the second motor/generator MG2 so as to obtain the calculated required value of the regenerative torque.

When the target vehicle deceleration value Gtgt is established by the regenerative operation of the second motor/generator MG2 in the decelerating run of the vehicle 10, the hybrid control portion 84 implements a fuel-cut control of the engine 14 to stop an operation of the engine 14 while placing the first motor/generator MG1 in a non-load free state and placing the engine speed $\omega$e at zero or substantially zero, to reduce generation of a pumping loss due to dragging of the engine 14 (a resistance to a rotary motion of the engine 14), so that the deceleration value of the vehicle 10 is accordingly reduced, while the regenerative torque generated by the second motor/generator MG2 is accordingly increased. Although the generation of the regenerative torque is given the highest priority, the required vehicle braking torque is obtained by the engine braking torque and/or the wheel braking torque, in place of a part or an entirety of the regenerative torque, when the generation of the regenerative torque by the second motor/generator MG2 is limited due to limitation of charging of the battery 52 (due to the maximum charging amount Win).

By the way, a determination to implement a shift-down action of the step-variable transmission portion 20 may be made as a result of an increase of the required value of the regenerative torque with the amount of operation of the brake operating member by the vehicle operator in a decelerating run of the vehicle 10, as indicated by an arrow-headed line C in FIG. 6. In this case, the increase of the regenerative torque as a result of the operation of the brake operating member and the shift-down action of the step-variable transmission portion 20 take place concurrently with each other in the decelerating run of the vehicle 10. The increase of the regenerative torque in the process of the shift-down action of the step-variable transmission portion 20 requires a longer length of time until the control of the shift-down action is completed, than where the regenerative torque is held stably constant, so that there is a possibility of deterioration of drivability of the vehicle 10. There is also a possibility of deterioration of drivability of the vehicle 10 due to a shift-down shock of the step-variable transmission portion 20, where a rate of rise of the engaging hydraulic pressure PRcb of the engaging-side coupling device to be placed in the engaged state to implement the shift-down action is increased to shorten the length of time required for the shift-down action during the increase of the regenerative torque. In this respect, it is considered possible to reduce the possibility of deterioration of the vehicle drivability, by implementing the shift-down action of the step-variable transmission portion 20 while the regenerative torque is held stably constant, that is, while the regenerative torque is substantially constant or while a rate of change of the regenerative torque is relatively low, even where the shift-down action of the step-variable transmission portion 20 and the increase of the regenerative torque as a result of the operation of the brake operating member take place concurrently with each other in the decelerating run of the vehicle 10. In view of these aspects of analysis, the electronic control device 80 is configured to implement the shift-down action of the step-variable transmission portion 20 while the regenerative torque is held stably constant, where the shift-down action of the step-variable transmission portion 20 and the increase of the regenerative torque as a result of the operation of the brake operating member take place concurrently with each other in the decelerating run of the vehicle 10. It is noted that the regenerative torque is a negative torque generated by the second motor/generator MG2 operated in the positive direction, and that the regenerative torque is considered to be large when the absolute value of the negative torque is large, and to be small or close to zero when the absolute value of the negative torque is small or close to zero.

Described more specifically, the electronic control device 80 further includes a regenerative-torque change-rate determining means or portion 90 and a vehicle state determining means or portion 92, which are provided to implement controls for implementing a shift-down action of the step-variable transmission portion 20 while the regenerative torque is held stably constant.

The regenerative-torque change-rate determining portion 90 is configured to determine whether a rate of change of the regenerative torque is held within a predetermined range. Described more specifically, the regenerative-torque change-rate determining portion 90 calculates the rate of change of the required value of the regenerative torque (hereinafter referred to as "regenerative torque change rate") according to the amount of operation of the brake operating member when a determination to implement a shift-down action of the step-variable transmission portion 20 is made by the transmission shifting control portion 82 in a decelerating run of the vehicle 10. For example, the regenerative-torque change-rate determining portion 90 repeatedly implements a control routine (illustrated in the flow chart of FIG. 8 described below), and calculates the regenerative torque change rate on the basis of a difference between a value of a signal indicative of the required value of the regenerative torque in the present cycle of the control routine and a value of a signal indicative of the required value of the regenerative torque in the last cycle. The regenerative-torque change-rate determining portion 90 determines that the regenerative torque change rate is held within the predetermined range, if the calculated regenerative torque change rate (more precisely, an absolute value of the change rate) is lower than a predetermined upper limit. Namely, the drivability of the vehicle 10 in the process of the shift-down action is not significantly deteriorated when the regenerative torque change rate is held within the predetermined range. In other words, the drivability of the vehicle 10 is significantly deteriorated when the regenerative torque change rate is higher than the above-indicated predetermined upper limit. The degree of deterioration of the drivability of the vehicle 10 in the process of the shift-down action of the step-variable transmission portion 20 may change depending upon the AT gear position to which the step-variable transmission portion 20 is shifted down. Therefore, the predetermined range or the predetermined upper limit may be set so as to change depending upon the AT gear position to which the step-variable transmission portion 20 is shifted down.

When the regenerative-torque change-rate determining portion 90 obtains an affirmative determination that the regenerative torque change rate is held within the predetermined range, the regenerative-torque change-rate determining portion 90 determines whether a predetermined length of time has elapsed since the regenerative torque change rate has fallen within the predetermined range, that is, determines whether the regenerative torque change rate has been held within the predetermined range for at least the predetermined length of time or more. Where the brake operating member is intermittently operated by the vehicle operator a plurality of times to increase the vehicle braking torque in a stepping manner, the regenerative torque change rate may temporarily fall within the predetermined range, due to a relatively long length of time between the adjacent intermittent operations of the brake operating member to increase the vehicle braking torque in the stepping manner. In this state of intermittent operations of the brake operating member to increase the vehicle braking torque in the stepping manner, the regenerative torque is not considered to be held stably constant. To exclude a determination that the regenerative torque is held stably constant in the above-indicated state of intermittent operations of the brake operating member, the regenerative-torque change-rate determining portion 90 determines whether the regenerative torque change rate has been held within the predetermined range for at least the predetermined length of time or more. Where the regenerative torque change rate has been held within the predetermined range for at least the predetermined length of time, the regenerative torque is considered to be held stably constant.

When the transmission shifting control portion 82 has made a determination to implement a shift-down action of the step-variable transmission portion 20 in the process of a regenerative torque control of the second motor/generator MG2 according to an operation of the brake operating member by the vehicle operator in a decelerating run of the vehicle 10, the transmission shifting control portion 82 initiates the implementation of the shift-down action after determination by the regenerative-torque change-rate determining portion 90 that the regenerative torque change rate has been held within the predetermined rage for at least the predetermined length of time or more. Described more specifically, when the transmission shifting control portion 82 has made the determination to implement the shift-down action, the transmission shifting control portion 82 does not implement the shift-down action, that is, delays generation of a hydraulic control command signal Sp in the form of a shift-down command to implement the shift-down action, where the regenerative-torque change-rate determining portion 90 determines that the regenerative torque change rate is not held within the predetermined range, or has not been held within the predetermined range for at least the predetermined length of time or more. On the other hand, where the regenerative-torque change-rate determining portion 90 determines that the regenerative torque change rate has been held within the predetermined range for at least the predetermined length of time or more when the determination of the shift-down action of the step-variable transmission portion 20 is made in the decelerating run of the vehicle 10, the transmission shifting control portion 82 generates the hydraulic control command signal Sp to implement the shift-down action, or cancels the delay of generation of the hydraulic control command signal Sp to implement the shift-down action.

Thus, the shift-down action of the step-variable transmission portion 20 is implemented while the regenerative torque is held stably constant. Further, to assure the implementation of the shift-down action of the step-variable transmission portion 20 in a highly stable state of the regenerative torque, the motor/generator control portion 88 may be configured to restrict an increase of the required value of the regenerative torque in spite of an operation of the brake operating member by the vehicle operator, or to restrict an increase of an actual value of the regenerative torque generated according to the regenerative torque control, irrespective of an increase of the required value of the regenerative torque as a result of the operation of the brake operating member by the vehicle operator, in the process of the shift-down action. To permit this mode of control by the motor/generator control portion 88, it is desirable to determine whether the regenerative torque change rate has been held within the predetermined range for at least the predetermined length of time or more. Namely, when the shift-down action of the step-variable transmission portion 20 is implemented where the above-indicated mode of control is implemented by the motor/generator control portion 88, the required value of the regenerative torque (also the actual value of the regenerative torque) will not increased in spite of an operation of the brake operating member by the vehicle operator to additionally increase the vehicle braking torque. For this purpose, the determination whether the brake operating member is additionally operated to increase the vehicle braking torque is made within the predetermined length of time.

The vehicle state determining portion 92 is configured to determine whether the vehicle running speed V (corresponding to the output speed ωo) is equal to or lower than a predetermined lower limit. This lower limit is a value of the vehicle running speed V below which the shift-down action of the step-variable transmission portion 20 should be implemented to prevent a risk of aggravation of a shift-down shock of the step-variable transmission portion 20 due to delayed generation of the hydraulic control command signal Sp as a result of the determination of the shifting action of the step-variable transmission portion 20. There is the risk of aggravation of the shift-down shock if the shift-down action is implemented after the vehicle running speed V has been lowered below a value lower than a shifting point used to determine whether the shift-down action should be implemented or not. This shifting point of the vehicle running speed V is predetermined for reducing the risk of aggravation of the shift-down shock. The shift-down shock is aggravated where the shift-down action is implemented after the vehicle running speed V has been lowered to a value considerably lower than the shifting point. Further, the shift-down shock is aggravated also where the accuracy of the synchronizing speed of the step-variable transmission portion 20 (=speed ratio γat*output speed ωo), namely, the accuracy of detection of the output speed ωo by the output speed sensor 66 is relatively low, and where a difference of values of the synchronizing speed before and after the shift-down action is relatively small, for example, as well as where the vehicle running speed V is relatively low as described above. The aggravation of the shift-down shock is particularly serious where the shift-down action is initiated as a result of an operation of the accelerator pedal while the implementation of the shift-down action is delayed. For these reasons, the lower limit of the vehicle running speed V is predetermined to prevent and reduce the risk of aggravation of the shift-down shock in the event of initiation of the shift-down action at the vehicle running speed V lower than the shifting point used for determination as to whether the shift-down action should be implemented or not. It is also noted that the shifting point of the vehicle running speed V changes depending upon the AT gear position to which the step-variable transmission portion 20 is shifted down. Accordingly, the value of the vehicle running speed V which is lower than the shifting point and below which there is a high risk of aggravation of the shift-down shock changes depending upon the above-indicated AT gear position. Therefore, the above-indicated lower limit of the vehicle running speed V is predetermined on the basis of the AT gear position to which the step-variable transmission portion 20 is shifted down.

Upon determination to implement the shift-down action of the step-variable transmission portion 20 in the process of the regenerative torque control of the second motor/generator MG2 according to the operation of the brake operating member by the vehicle operator in the decelerating run of the vehicle 10, the transmission shifting control portion 82 initiates implementation of the shift-down action when the vehicle state determining portion 92 determines that the vehicle running speed V is equal to or lower than the predetermined lower limit, even before the regenerative-torque change-rate determining portion 90 determines that the regenerative torque change rate is held within the predetermined range for at least the predetermined length of time or more.

Figure 8:
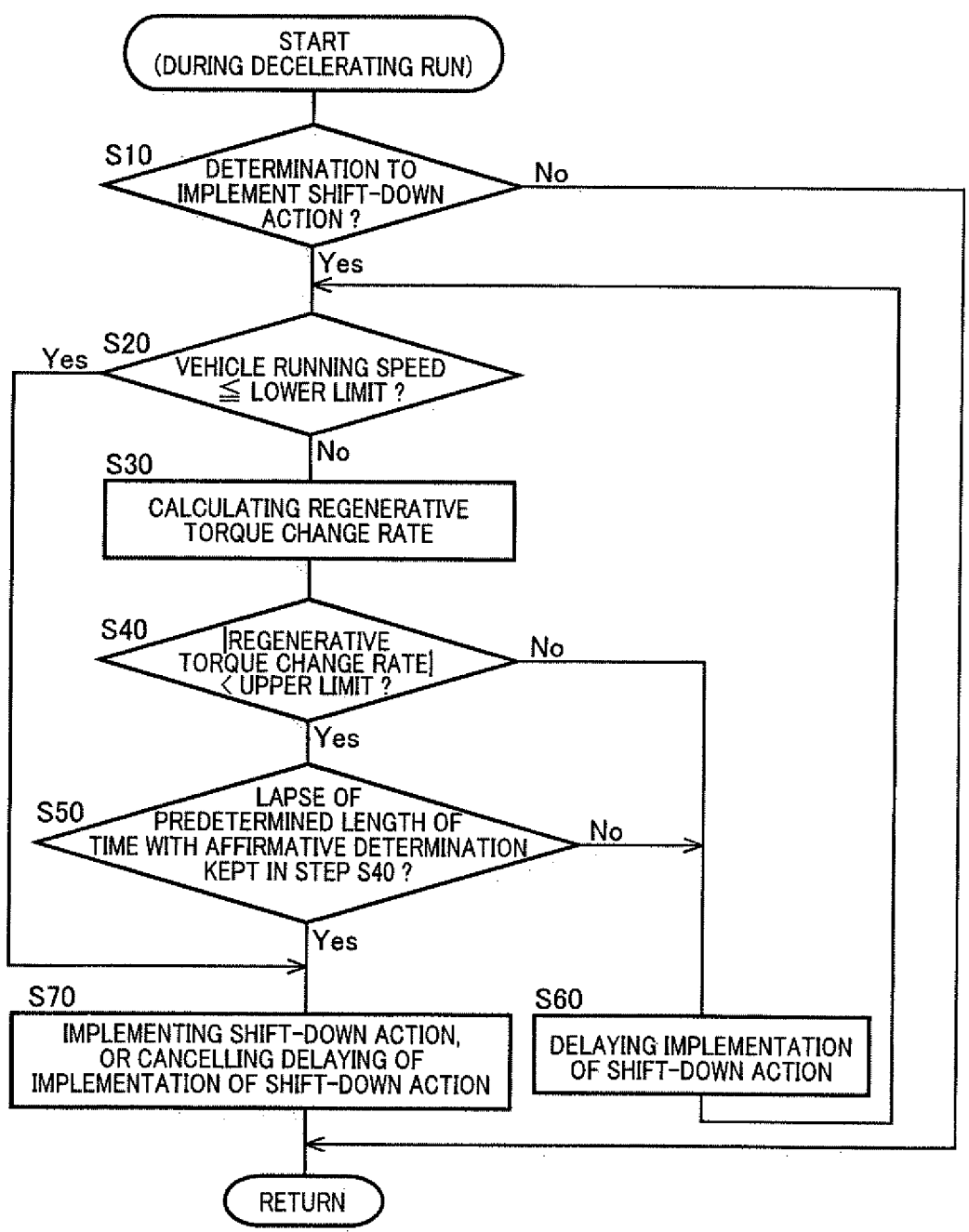
FIG. 8 is a flow chart illustrating an essential part of a control routine executed by an electronic control device, namely, a control operation implemented so as to improve fuel economy of the vehicle while reducing deterioration of drivability of the vehicle, in the event of an increase of a regenerative torque as a result of a vehicle braking operation concurrently with a shift-down action of the step-variable transmission portion during a decelerating run of the vehicle.
Figure 9:
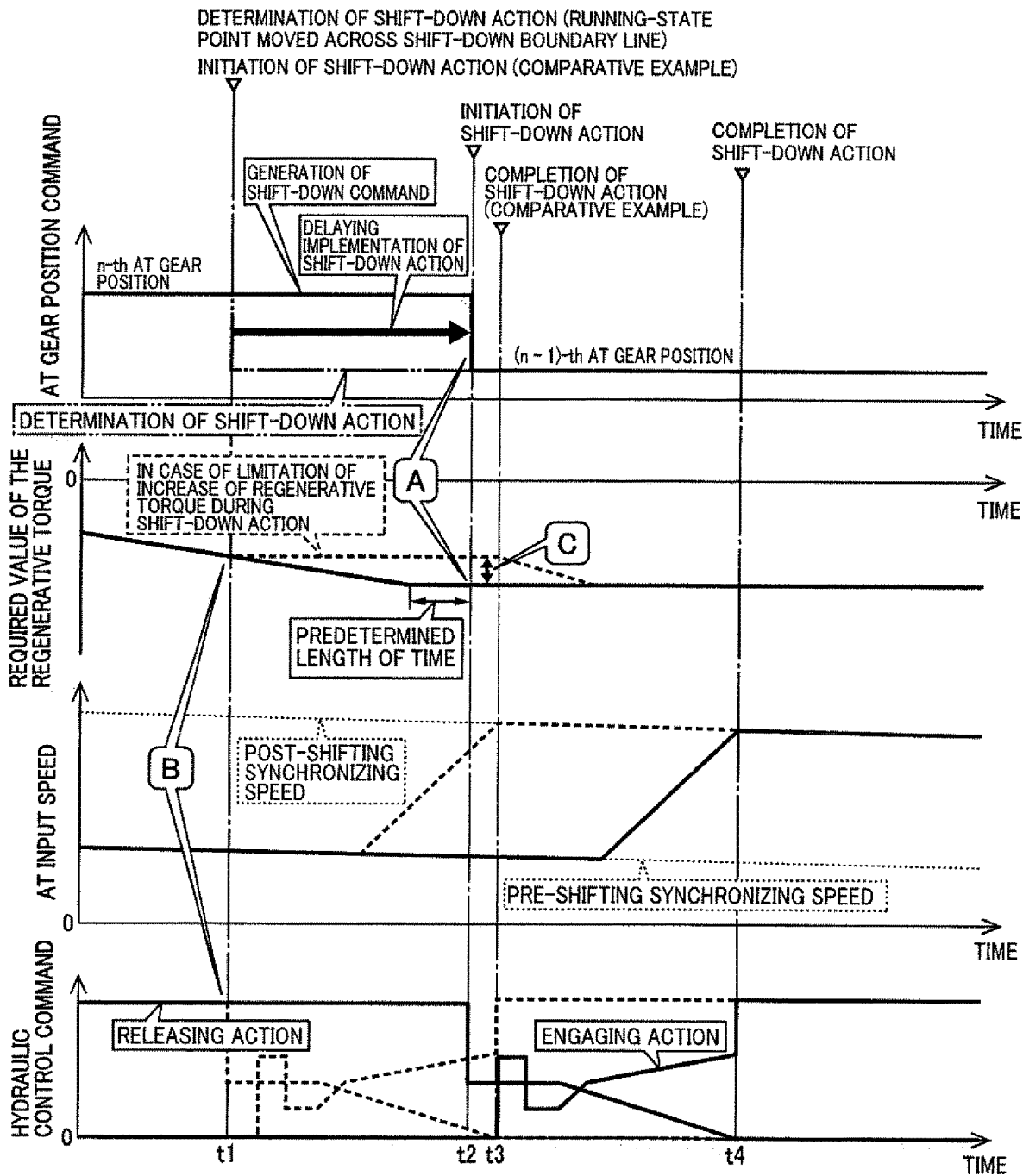
FIG. 9 is a time chart showing an example of the control operation illustrated in the flow chart of FIG. 8, which is performed when a determination to implement a shift-down action of the step-variable transmission portion is made in the process of a regenerative torque control according to the vehicle braking operation in the decelerating run of the vehicle.
Figure 10:
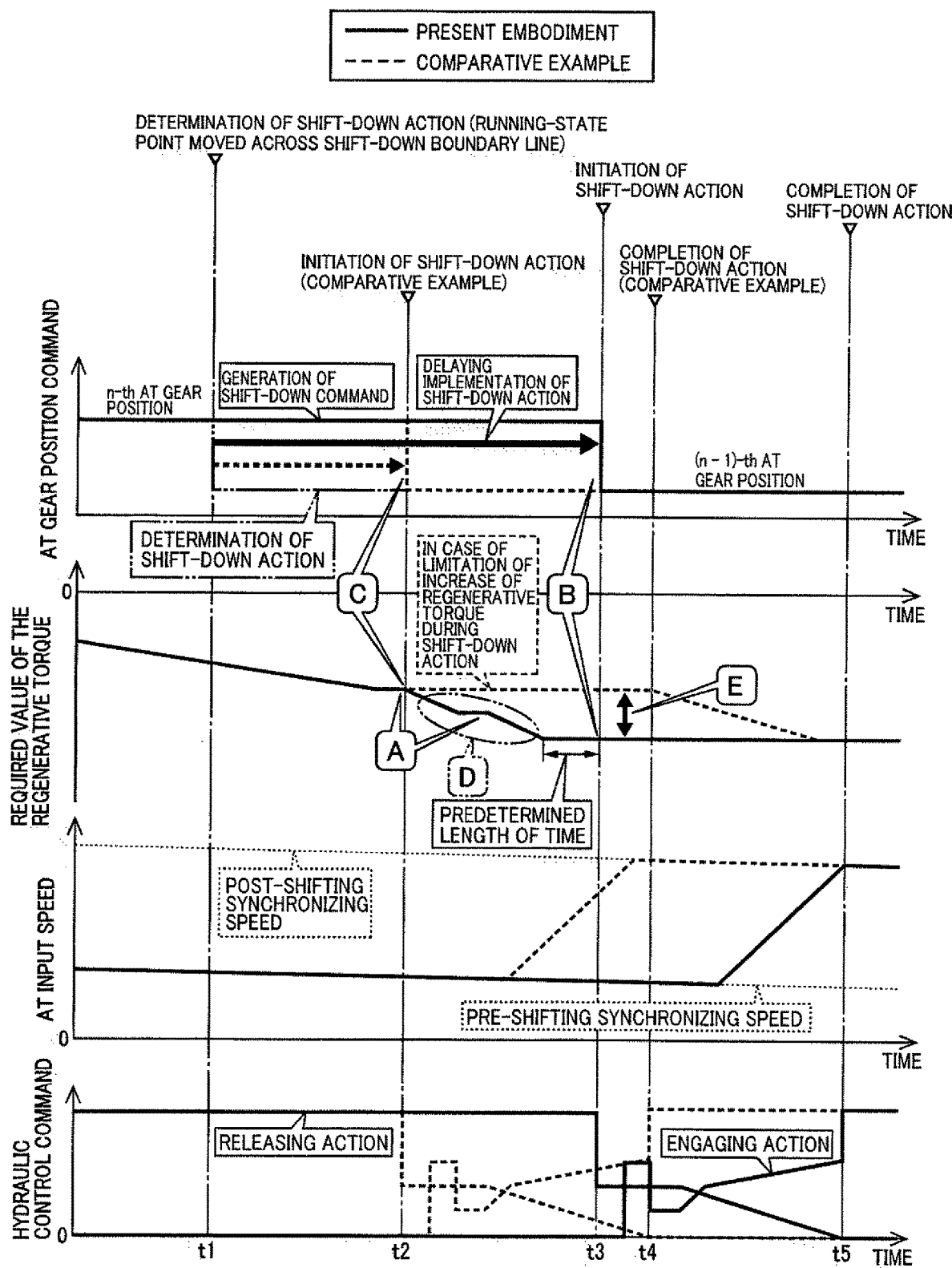
FIG. 10 is a time chart showing another example of the control operation illustrated in the flow chart of FIG. 8, which is performed where a brake operating member (brake pedal, for example) is intermittently operated a plurality of times to increase a vehicle braking torque in a stepping manner in the decelerating run of the vehicle.
Figure 11:
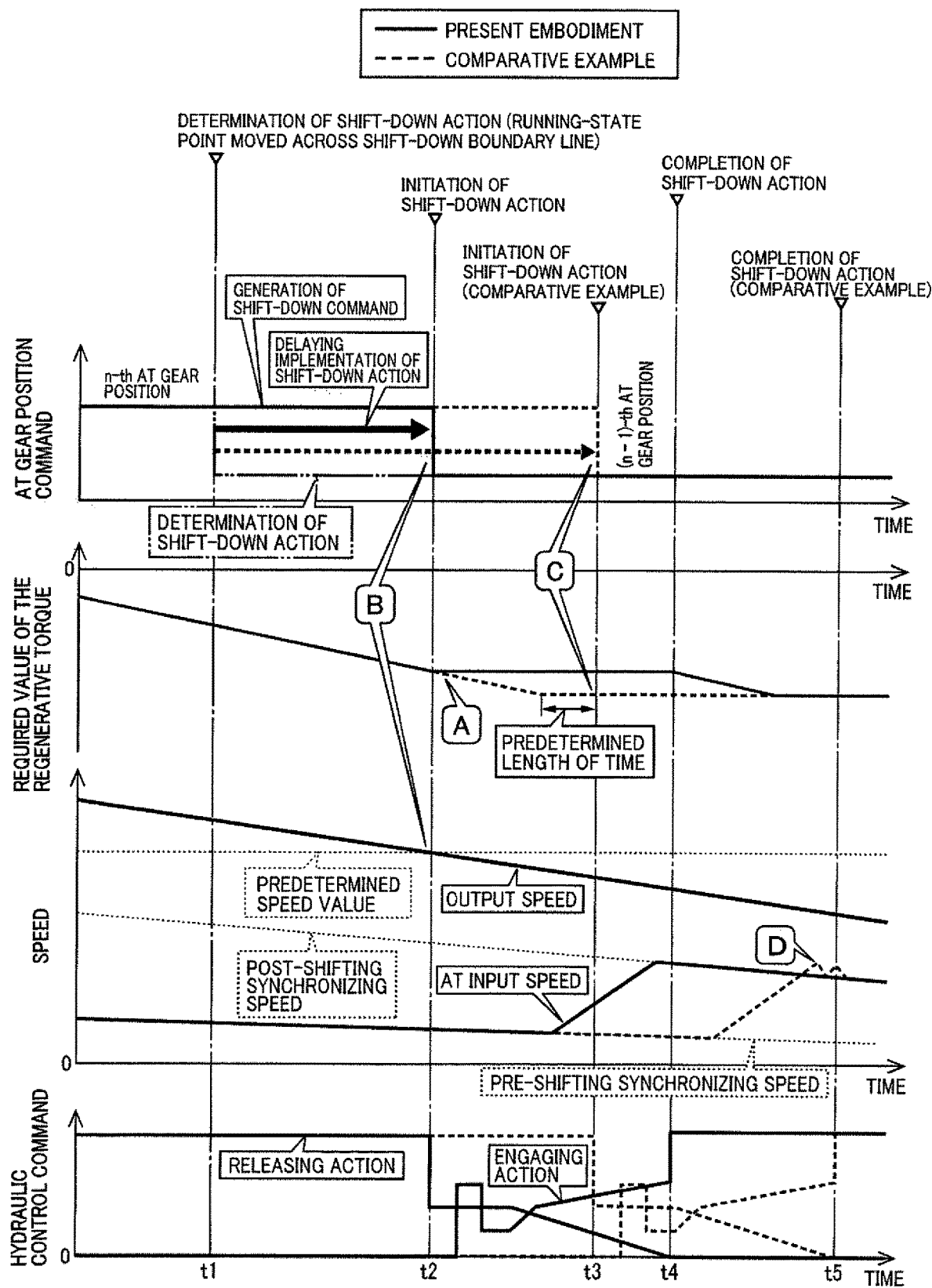
FIG. 11 is a time chart showing an example of the control operation illustrated in the flow chart of FIG. 8, which is performed so as to delay generation of a shift-down command, for reducing a shift-down shock of the step-variable transmission portion.

FIG. 8 is the flow chart illustrating an essential part of a control routine executed by the electronic control device 80, namely, a control operation implemented so as to improve fuel economy of the vehicle 10 while reducing deterioration of drivability of the vehicle 10, in the event of an increase of the regenerative torque of the second motor/generator MG2 as a result of an operation of the brake operating member concurrently with a shift-down action of the step-variable transmission portion 20 during a decelerating run of the vehicle 10. The control routine is repeatedly executed in the decelerating run of the vehicle 10. FIGS. 9, 10 and 11 are the time charts showing examples of the control routine illustrated in the flow chart of FIG. 8.

The control routine of FIG. 8 is initiated with a step S10 corresponding to a function of the transmission shifting control portion 82, to determine whether a determination to implement a shift-down action of the step-variable transmission portion 20 has been made or not. If a negative determination is obtained in the step S10, one cycle of execution of the control routine is terminated. If an affirmative determination is obtained in the step S10, the control flow goes to a step S20 corresponding to a function of the vehicle state determining portion 92, to determine whether the vehicle running speed V has been lowered to or below than the predetermined lower limit. If a negative determination is obtained in the step S20, the control flow goes to a step S30 corresponding to a function of the regenerative-torque change-rate determining portion 90, to calculate the regenerative torque change rate. Then, the control flow goes to a step S40 also corresponding to the function of the regenerative-torque change-rate determining portion 90, to determine whether the absolute value of the regenerative torque change rate calculated in the step S30 is smaller than the predetermined upper limit (namely, is held within the predetermined range). If an affirmative determination is obtained in the step S40, the control flow goes to a step S50 also corresponding to the function of the regenerative-torque change-rate determining portion 90, to determine whether the determination that the regenerative torque change rate is held within the predetermined range is kept obtained (that is, whether the affirmative determination is kept in the step S40) for at least the predetermined length of time or more. If a negative determination is obtained in the step S40 or S50, the control flow goes to a step S60 corresponding to a function of the transmission shifting control portion 82, to delay the generation of the hydraulic control command signal Sp to implement the shift-down action of the step-variable transmission portion 20 required in the step S10. Then, the control flow goes back to the step S20. If an affirmative determination is obtained in the step S20 or S50, the control flow goes to a step S70 also corresponding to the function of the transmission shifting control portion 82, to generate the hydraulic control command signal Sp to implement the shift-down action of the step-variable transmission portion 20 required in the step S10, or to cancel the delaying of generation of the hydraulic control command signal Sp, which was initiated in the step S60.

FIG. 9 is the time chart showing an example of a control operation performed when a determination to implement a shift-down action of the step-variable transmission portion 20 is made in the process of the regenerative torque control according to an operation of the brake operating member by the vehicle operator in the decelerating run of the vehicle 10. In the time chart of FIG. 9, "t1" represents a point of time at which the determination to implement the shift-down action of the step-variable transmission portion 20 (from the n-th AT gear position to the (n−1)-th AT gear position) is made as a result of an increase of the required value of the regenerative torque caused by an operation of the brake operating member or an increase of an amount of operation of the brake operating member (for example, an increase of an amount of operation of the brake pedal) in the decelerating run of the vehicle 10. While the regenerative torque change rate is not lower than the predetermined upper limit (while a rate of increase of the required value of the regenerative torque is not lower than the upper limit, for instance), a command to implement the shift-down action (hydraulic control command signal Sp) is not generated, that is, the initiation of the shift-down action is delayed (by a length of time from the point of time t1 to a point of time t2). After the required value of the regenerative torque has been held stably constant as a result of reduction of the regenerative torque change rate (as indicated by a mark "A"), the hydraulic control command signal Sp is generated so that the shift-down action is initiated (at the point of time t2). Subsequently, the shift-down action is completed (at a point of time t4). In a comparative example indicated by broken lines in FIG. 9, the hydraulic control command signal Sp is generated at the time of the determination to implement the shift-down action (as indicated by a mark "B"), so that the shift-down action is initiated (at the point of time t1). In the process of the shift-down action implemented while the regenerative torque is held stably constant, an increase of the required value of the regenerative torque is restricted. After the shift-down action is completed (at a point of time t3), the required value of the regenerative torque the increase of which has been restricted is gradually increased to a value corresponding to the operation of the brake operating member by the vehicle operator (after the point of time t3). In this comparative example in which the increase of the required value of the regenerative torque is restricted, the efficiency of regenerative operation of the second motor/generator MG2 is reduced. Contrary to the comparative example, the present embodiment of the invention is configured to permit an improvement of the efficiency of the regenerative operation (as indicated by a mark "C") while reducing the risk of deterioration of drivability of the vehicle 10 in the process of the shift-down action as in the comparative example. Namely, the present embodiment is considered to permit a relatively high chance of determination to implement the shift-down action according to the shifting map indicated in FIG. 6, and an accordingly high possibility of increase of the regenerative torque. In the comparative example in which the shift-down action is immediately implemented to restrict the increase of the regenerative torque, the efficiency of the regenerative operation is deteriorated, and the fuel economy of the vehicle 10 is accordingly deteriorated. In order to improve the fuel economy while reducing the risk of deterioration of drivability of the vehicle 10, it is effective to delay the implementation of the shift-down action as in the present embodiment. The present embodiment provides a technique for dealing with the determination to implement the shift-down action of the step-variable transmission portion 20 in the decelerating run of the vehicle 10, which determination is made in the process of an increase of the regenerative torque of the second motor/generator MG2. This technique is different from a technique for preventing busy or frequent shifting actions of the step-variable transmission portion 20 in the case of inhibiting implementation of its shift-up action upon determination of the shift-up action made as a result of releasing of the accelerator pedal to its non-operated position in an accelerating run of the vehicle 10, or a technique for improving the drivability of the vehicle 10 in the case of a subsequent operation of the accelerator pedal while the step-variable transmission portion 20 is held in a low-speed gear position.

FIG. 10 is the time chart showing an example of a control operation performed where the brake operating member (brake pedal, for example) is intermittently operated by the vehicle operator a plurality of times to increase the vehicle braking torque in a stepping manner in the decelerating run of the vehicle 10. As in the time chart of FIG. 9, "t1" in the time chart of FIG. 10 represents the point of time at which the determination to implement the shift-down action of the step-variable transmission portion 20 is made as a result of an increase of the required value of the regenerative torque in the decelerating run of the vehicle 10. While the regenerative torque change rate is not lower than the predetermined upper limit, the generation of the shift-down command (hydraulic control command signal Sp) is delayed. Even when the regenerative torque change rate becomes lower than the upper limit (as indicated by a mark "A"), delaying of the generation of the shift-down command is not cancelled, until the regenerative torque change rate has been held lower than the upper limit for at least the predetermined length of time. In this case, too, the initiation of the shift-down action is delayed (by a length of time from the point of time t1 to a point of time t3). When the regenerative torque change rate has been held lower than the upper limit for at least the predetermined length of time, delaying of the generation of the shift-down command to implement the shift-down action (hereinafter referred to as "shift-down command") is cancelled (as' indicated by a mark "B"), and the shift-down action is initiated at the point of time t3, and is completed at a point of time t5. In a comparative example indicated by broken lines in FIG. 10, the generation of the shift-down command to implement the shift-down action is delayed while the regenerative torque change rate is held higher than the upper limit. In this comparative example, delaying of the generation of the shift-down command is cancelled (as indicated by a mark "C"), and the shift-down action is initiated at a point of time t2 as soon as the regenerative torque change rate has become lower than the upper limit, namely, before the regenerative torque change rate has been held lower than the upper limit for at least a predetermined length of time. In the process of the shift-down action implemented while the regenerative torque is held stably constant, an increase of the required value of the regenerative torque is restricted. After the shift-down action is completed (at a point of time t4), the required value of the regenerative torque the increase of which has been restricted is gradually increased to a value corresponding to the operation of the brake operating member by the vehicle operator (after the point of time t4). The required value of the regenerative torque may increase (as indicated by a dot-tow chain line mark "D") by an operation of the brake operating member by the vehicle operator after the regenerative torque change rate has once becomes lower than the upper limit due to a relatively long length of time between unstable intermittent operations of the brake operating member to increase the vehicle braking torque. In this comparative example in which delaying of the generation of the shift-down command is cancelled as soon as the regenerative torque change rate has once become lower than the upper limit, the increase of the required value of the regenerative torque is restricted, so that the regenerative torque control is unnecessarily limited where the brake operating member is intermittently operated a plurality of times to increase the vehicle braking torque in the stepping manner. Contrary to the comparative example, the present embodiment of the invention is configured such that delaying of the generation of the shift-down command is not cancelled until the regenerative torque change rate has been held lower than the upper limit for at least the predetermined length of time. Accordingly, the present embodiment permits an improvement of the efficiency of the regenerative operation (as indicated by a mark "E") even where the brake operating member is intermittently operated a plurality of times to increase the vehicle braking torque in the stepping manner. Namely, in order to improve the fuel economy while reducing the risk of deterioration of drivability of the vehicle 10, it is effective to delay the implementation of the shift-down action until the regenerative torque change rate has been held lower than the upper limit for at least the predetermined length of time, as in the present embodiment. The present embodiment provides a technique for dealing with unstable intermittent operations of the brake operating member by the vehicle operator.

FIG. 11 is the time chart showing an example of a control operation performed so as to delay the generation of the shift-down command, for reducing a shift-down shock of the step-variable transmission portion 20. As in the time chart of FIG. 9, "t1" in the time chart of FIG. 11 represents the point of time at which the determination to implement the shift-down action of the step-variable transmission portion 20 is made as a result of an increase of the required value of the regenerative torque in the decelerating run of the vehicle 10. While the regenerative torque change rate is not lower than the predetermined upper limit, the generation of the shift-down command (hydraulic control command signal Sp) is delayed. However, delaying of the generation of the shift-down command is cancelled (as indicated by a mark "B"), and the shift-down action is initiated at a point of time t2, when the output speed ωo has been lowered to or below a predetermined value, even while the required value of the regenerative torque is being increased (as indicated by a mark "A"). Namely, delaying of the generation of the shift-down command is inhibited after the output speed ωo has been lowered to or below the predetermined value below which there is a risk of aggravation of the shift-down shock of the step-variable transmission portion 20. In the process of the shift-down action while the regenerative torque is held stably constant, an increase of the required value of the regenerative torque is restricted for a period from the point of time t2 to a point of time t4. After the shift-down action is completed (at the point of time t4), the required value of the regenerative torque the increase of which has been restricted is gradually increased to a value corresponding to the operation of the brake operating member by the vehicle operator (after the point of time t4). In a comparative example indicated by broken lines in FIG. 11, the generation of the shift-down command to implement the shift-down action is delayed while the regenerative torque change rate is held higher than the upper limit. In this comparative example, delaying of the generation of the shift-down command is cancelled (as indicated by a mark "C") after the regenerative torque change rate has been held lower than a predetermined upper limit for at least a predetermined length of time, and the shift-down action is initiated at a point of time t3 and is completed at a point of time t5. In this comparative example, delaying of the generation of the shift-down command even after the output speed ωo has been lowered to or below the predetermined value causes the shift-down action to subsequently take place in a running state of the vehicle 10 deviating from a relevant shift-down boundary line defined by adaptation, for example, or the accuracy of control of the synchronizing speed in the process of the shift-down action is lowered as the output speed ωo is lowered, so that there is a risk of aggravation of the shift-down shock of the step-variable transmission portion 20 (as indicated by a mark "D"). Contrary to the comparative example, the present embodiment of the invention is configured to initiate the shift-down action after delaying of the generation of the shift-down command, before the output speed ωo has been lowered to or below the predetermined value below which there is the risk of aggravation of the shift-down shock. Accordingly, the present embodiment prevents or reduces the risk of aggravation of the shift-down shock. Namely, in order to improve the fuel economy while reducing the risk of deterioration of drivability of the vehicle 10, it is effective to cancel delaying of the generation of the shift-down command when the output speed ωo (vehicle running speed V) has been lowered to or below the predetermined value, as in the present embodiment. The present embodiment provides a technique for reducing the shift-down shock with higher priority than improving the fuel economy, in a running state of the vehicle 10 in which there is a risk of aggravation of the shift-down shock, and also a technique which deals with the shift-down action at the output speed ωo lower than a value below which there is a risk of generation of the shift-down shock, and which permits an improvement of the fuel economy by delaying the generation of the shift-down command.

The present embodiment described above is configured to initiate the shift-down action of the step-variable transmission portion 20 after the rate of change of the regenerative torque has been held within the predetermined range for at least the predetermined length of time, where the determination to implement the shift-down action is made in the process of the regenerative torque control of the second motor/generator MG2 according to the braking operation. Namely, the present embodiment is configured such that the implementation of the shift-down action is delayed until the rate of change of the regenerative torque has been held within the predetermined range for at least the predetermined length of time. Accordingly, it is possible to increase an amount of a regenerated electric energy, while restricting an increase of the regenerative torque when the shift-down action is implemented in the process of the regenerative torque control to reduce the risk of deterioration of drivability of the vehicle 10. The present embodiment is further configured to implement the shift-down action while the rate of change of the regenerative torque is held stably constant at a low value. In this respect, it is noted that the rate of change of the regenerative torque may fall within the predetermined range due to a relatively long length of time between unstable intermittent operations of the brake operating member by the vehicle operator to increase the vehicle braking torque in the stepping manner. If the shift-down action is implemented in this case, the regenerative torque is increased as a result of the subsequent operation of the brake operating member to increase the vehicle braking torque in the process of the shift-down action, giving rise to a risk of an increase of the time required for completion of the shift-down action, and a risk of deterioration of drivability of the vehicle 10 due to fluctuation of the vehicle braking torque. In the present embodiment, the shift-down action is initiated only after the rate of change of the regenerative torque has been held within the predetermined range for at least the predetermined length of time, that is, after a possibility of the subsequent operation of the brake operating member to increase the vehicle braking torque has been reduced. Accordingly, the shift-down action is implemented while the rate of change of the regenerative torque is held stably constant at a low value. In other words, if the increase of the regenerative torque is restricted to reduce the risk of deterioration of drivability of the vehicle 10 where the shift-down action is initiated after the brake operating member is held in its non-operated position for a relatively long length of time between the unstable intermittent operations, the increase of the regenerative torque is restricted when the brake operating member is subsequently operated to increase the vehicle braking torque. In the present embodiment, the implementation of the shift-down action is delayed until the rate of change of the regenerative torque has been held within the predetermined range for at least the predetermined length of time, so that the regenerative torque is increased when the brake operating member is subsequently operated to increase the vehicle braking torque. Accordingly, the present embodiment permits an improvement of fuel economy of the vehicle 10 while reducing the risk of deterioration of drivability of the vehicle 10 in the process of an increase of the regenerative torque due to an operation of the brake operating member during the shift-down action of the step-variable transmission portion 20 in the decelerating run of the vehicle 10.

The present embodiment is further configured such that the shift-down action of the step-variable transmission portion 20 is initiated when the running speed V of the vehicle 10 is lowered to or below the predetermined lower limit, even before the rate of change of the regenerative torque has been held within the predetermined range for at least the predetermined length of time. If the implementation of the shift-down action is delayed until the rate of change of the regenerative torque has been held within the predetermined range for at least the predetermined length of time, the shift-down action is initiated at the vehicle running speed V lower than a value at which the determination to implement the shift-down action is made, so that there is a risk of aggravation of the shift-down shock. In view of this risk, the shift-down action is implemented before the running speed V is lowered to or below the lower limit below which the shift-down shock is aggravated.

In the present embodiment, the regenerative torque of the second motor/generator MG2 is the required value of the regenerative torque which increases with an increase of the amount of operation of the brake operating member by the operator of the vehicle, and the rate of change of the regenerative torque is the rate of change of the required value of the regenerative torque. Accordingly, the implementation of the shift-down action of the step-variable transmission portion 20 is delayed in the process of an increase of the required value of the regenerative torque while the regenerative torque change rate is not held within the predetermined range. Accordingly, it is possible to increase the regenerated electric energy with an increase of the actual value of the regenerative torque during the increase of the required value of the regenerative torque.

According to the present embodiment configured to initiate the shift-down action of the step-variable transmission portion 20 after the regenerative torque change rate has been held within the predetermined range for at least the predetermined length of time, the shift-down action is implemented while the regenerative torque change rate is held stably constant at a low value, so that it is possible to reduce the risk of deterioration of drivability of the vehicle 10 due to delayed concurrent engaging and releasing actions of the coupling devices CB to shift-down the step-variable transmission portion 20 in the process of an increase of the regenerative torque as a result of intermittent operations of the brake operating member to increase the vehicle braking torque in the stepping manner. In addition, the above-indicated range of the regenerative torque change rate is predetermined for each of the AT gear positions to which the step-variable transmission portion 20 is shifted down. Accordingly, the shift-down actions of the step-variable transmission portion 20 to the respective AT gear positions are implemented so as to appropriately reduce the risk of deterioration of drivability of the vehicle 10, irrespective of different degrees of deterioration of the drivability when the step-variable transmission portion 20 is shifted down to the respective AT gear positions. Therefore, the present embodiment makes it possible to reduce a possibility of delayed completion of a shift-down action due to delayed initiation of the shift-down action in spite of a relatively low degree of risk of deterioration of the drivability due to implementation of that shift-down action, or a possibility of increased deterioration of the drivability due to a shift-down action initiated in spite of a relatively high degree of risk of deterioration of the drivability due to implementation of that shift-down action.

A second embodiment of this invention will be described. It is noted that the same reference signs as used in the first embodiment will be used to identify the elements of the second embodiment corresponding to those of the first embodiment, and that those elements will not be redundantly described.

Second Embodiment

Figure 12:
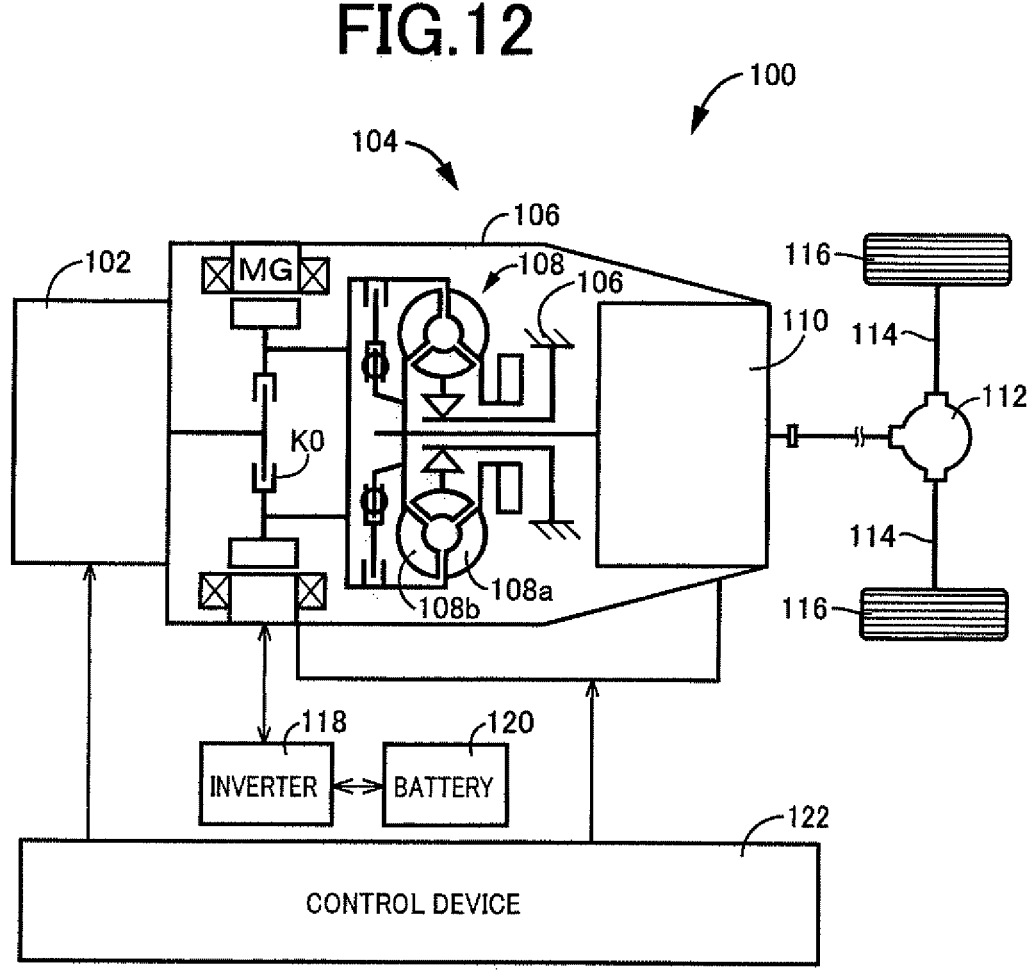
FIG. 12 is a schematic view showing an arrangement of a vehicular drive system different from that of FIG. 1, which is to be controlled by the control apparatus according to the present invention.

In this second embodiment, the control apparatus according to the invention is used for controlling a vehicle 100 shown in FIG. 12, which is different from the vehicle 10 in the first embodiment in which the continuously variable transmission portion 18 and the step-variable transmission portion 20 are connected in series with each other.

As shown in FIG. 12, the vehicle 100 is a hybrid vehicle provided with an engine 102 functioning as a drive power source, a motor/generator MG also functioning as the drive power source, and a power transmitting system 104. The power transmitting system 104 is provided with a clutch K0, a torque converter 108, and an automatic transmission 110, which are disposed within a stationary member in the form of a casing 106 fixed to a body of the vehicle 100, in this order of description as seen in the direction from the engine 102. The power transmitting system 104 further includes a differential gear device 112, and axles 114. The torque converter 108 has a pump impeller 108a selectively connected to the engine 102 through the clutch K0 and directly connected to the motor/generator MG, and a turbine impeller 108b directly connected to the automatic transmission 110. In the power transmitting system 104, a drive force of the engine 102 and/or a drive force of the motor/generator MG are/is transmitted to drive wheels 116 of the vehicle 100 through the clutch K0 (where the drive force of the engine 102 is transmitted), the torque converter 108, the automatic transmission 110, the differential gear device 112 and the axles 114, in this order of description. The automatic transmission 110 is a mechanically operated transmission mechanism which constitutes a part of a power transmitting path between the drive power source (engine 102 and motor/generator MG) and the drive wheels 116. The vehicle 100 is further provided with an inverter 118, and an electric power storage device in the form of a battery 120 to and from which an electric power is respectively supplied from and to the motor/generator MG through the inverter 118, as well as a control device 122.

The control device 122 is configured to selectively establish a motor drive mode in which the vehicle 100 is driven with only the motor/generator MG operated as the drive power source with electric power supplied from the battery 120 while the engine 102 is held at rest, in the released state of the clutch K0, or a hybrid drive mode in which the vehicle 100 is driven with the engine 102 operated as the drive power source, in the engaged state of the clutch K0. In the hybrid drive mode established by the control device 122, a drive torque generated by the motor/generator MG with the electric power supplied from the battery 120 may be added to the drive force generated by the engine 102, or the motor/generator MG may be operated as an electric generator with the drive force of the engine 102, so that the battery 120 is charged with the electric power generated by the motor/generator MG. Thus, the motor/generator MG is an electrically operated rotary device having a function of an electric motor and a function of an electric generator. An output torque (vehicle driving torque or regenerative torque) of the motor/generator MG is controlled by the inverter 118 under the control of the control device 122.

The control device 122 has the functions of the transmission shifting control portion 82, hybrid control portion 84 (engine control portion 86 and motor/generator control portion 88), regenerative-torque change-rate determining portion 90 and vehicle state determining portion 92, which are incorporated in the electronic control device 80 according to the illustrated first embodiment. Like the electronic control device 80, the control device 122 is configured to control implementation of the shift-down action of the automatic transmission 110 while the regenerative torque of the motor/generator MG is held stably constant.

The present second embodiment has the same advantages as the first embodiment previously described.

While the preferred embodiments of this invention have been described in detail by reference to the drawings, it is to be understood that the invention may be otherwise embodied.

In the illustrated embodiments, the determination to implement a shift-down action of the step-variable transmission portion 20 in the process of an increase of the regenerative torque of the motor/generator MG2 or MG is made where the required value of the regenerative torque is increased as a result of an operation of the brake operating member in a decelerating run of the vehicle 10, as indicated by the arrow-headed line C in FIG. 6 by way of example. However, the determination may be made in the case of an increase of the required value of the regenerative torque as a result of an operation of the brake operating member performed substantially concurrently with or immediately after the vehicle running speed V is lowered. Namely, the control according to the present invention is applicable to any shift-down action of the step-variable transmission portion 20 in a decelerating run of the vehicle 10, which takes place concurrently with an increase of the regenerative torque as a result of an operation of the brake operating member.

In the illustrated embodiments, the regenerative torque according to the operation of the brake operating member is the required value of the regenerative torque which increases with an increase of the amount of operation of the brake operating member, and the regenerative torque change rate is the rate of change of the required value of the regenerative torque. For example, the actual value of the regenerative torque follows the required value of the regenerative torque as long as the actual value of the regenerative torque is not larger than the maximum charging amount Win of electric power that can be stored in the battery 52. Accordingly, the rate of change of the actual value of the regenerative torque may be used as the regenerative torque change rate. The use of the actual value of the regenerative torque is advantageous for improved coordination of the manner of increase of the regenerative torque with prevention of deterioration of the drivability of the vehicle 10 due to an increase of the regenerative torque in the process of the shift-down action of the step-variable transmission portion 20.

The illustrated embodiments are configured to determine whether the absolute value of the regenerative torque change rate is lower than the predetermined upper limit, for determining whether the regenerative torque change rate is held within the predetermined range. However, the absolute value of the regenerative torque change rate need not be compared with the upper limit when the determination as to whether the regenerative torque change rate is held within the predetermined range is made. That is, where the regenerative torque change rate is a negative value, this negative value may be compared with a predetermined value set for the negative value.

In the illustrated embodiments, the brake pedal is used as an example of the brake operating member. However, the brake operating member may be a vehicle deceleration setting device operable by the vehicle operator to set a target value of the vehicle deceleration in a decelerating run of the vehicle 10. Further, the brake operating member may be the shift lever 56 which is operable to shift the step-variable transmission portion 20 in a manual shifting mode in the decelerating run of the vehicle 10.

In the illustrated first embodiment, the vehicle 10 is provided with the differential mechanism 32 in the form of a planetary gear set of a single-pinion type, and the continuously variable transmission portion 18 functioning as an electrically controlled transmission mechanism. However, the continuously variable transmission portion 18 may be a transmission mechanism the differential state of which is limited by controlling a clutch or brake connected to one of the rotary elements of the differential mechanism 32. Further, the differential mechanism 32 may be a planetary gear set of a double-pinion type, or may be replaced by a differential mechanism which includes a plurality of planetary gear sets having four or more rotary elements. Further, the differential mechanism 32 may be replaced by a differential gear device including a pinion rotated by the engine 14, and a pair of bevel gears which mesh with the pinion and to which the first motor/generator MG1 and the intermediate power transmitting member 30 are respectively connected. Further, the differential mechanism 32 may be replaced by a mechanism which includes two or more planetary gear sets rotary elements of which are connected to each other and/or operatively connected to the engine, motor/generator and drive wheels, in power transmittable manner.

The vehicle 100 in the second embodiment may not be provided with the engine 102, the clutch K0 and the torque converter 108. In this case, the motor/generator MG is connected directly to an input rotary member of the automatic transmission 110. Namely, the control apparatus according to the present invention is applicable to a vehicle which is provided with a motor/generator functioning as a drive power source, and a mechanically operated transmission mechanism which constitutes a part of a power transmitting path between the motor/generator and drive wheels. While the vehicle 100 uses the torque converter 108 as a fluid-operated power transmitting device, the vehicle 100 may use other types of fluid-operated power transmitting devices such as a fluid coupling, which do not have a torque boosting function. Further, the torque converter 108 need not be provided, or may be replaced by a device having a simple clutch function.

In the illustrated first embodiment, the step-variable transmission portion 20 of a planetary gear type is provided as a mechanically operated transmission mechanism. This step-variable transmission portion 20 or the automatic transmission 110 in the illustrated second embodiment may be replaced by any other type of known automatic transmission such as a synchronous meshing parallel two-axes type automatic transmission, a DCT (Dual Clutch Transmission) which is the synchronous meshing parallel two-axes type automatic transmission and which has two input shafts, or a continuously variable transmission (CVT).

In the illustrated first embodiment, the transmission device 40 as a whole is shifted to a selected one of the overall speed positions, like a step-variable transmission, according to the overall speed position shifting map. However, the transmission device 40 may be shifted to the selected overall speed position according to an operation of the shift lever 56, a shift-up/shift-down switch or any other member operated by the vehicle operator to shift the transmission device 40.

In the illustrated first embodiment, the ten overall speed positions are established for the four AT gear appositions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power transmitting member 30 and the operating speed of the second motor/generator MG2 connected to the intermediate power transmitting member 30 are held within respective predetermined ranges, and the transmission device 40 is shifted such that the engine speed toe is held within a predetermined range.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle
14: Engine
18: Electrically controlled continuously variable transmission portion (Electrically controlled transmission mechanism)
20: Mechanically operated step-variable transmission portion (Mechanically operated transmission mechanism; Step-variable automatic transmission)
28: Drive wheels
30: Intermediate power transmitting member (Output rotary member of electrically controlled transmission mechanism)
32: Differential mechanism
80: Electronic control device (Control apparatus)
82: Transmission shifting control portion (Shift control portion)
88: Motor/generator control portion
CB: Coupling devices
MG1: First motor/generator
MG2: Second motor/generator (Motor/generator)
100: Vehicle
110: Automatic transmission (Mechanically operated transmission mechanism)
116: Drive wheels
122: Control device
MG: Motor/generator

What is claimed is:

1. A control apparatus for a vehicle provided with a motor/generator functioning as a drive power source, and a mechanically operated transmission mechanism which constitutes a part of a power transmitting path between the motor/generator and drive wheels, the control apparatus comprising:
a processor programmed to:
implement a regenerative torque control of the motor/generator so as to generate a regenerative torque according to a braking operation by an operator of the vehicle in a decelerating run of the vehicle; and
initiate a shift-down action of the mechanically operated transmission mechanism after a rate of change of the regenerative torque has been held within a predetermined range for at least a predetermined length of time, where a determination to implement the shift-down action is made in the process of the regenerative torque control of the motor/generator according to the braking operation.

2. The control apparatus according to claim 1, wherein the processor initiates the shift-down action of the mechanically operated transmission mechanism, when a running speed of the vehicle is lowered to or below a predetermined lower limit, even before the rate of change of the regenerative torque has been held within the predetermined range for at least the predetermined length of time.

3. The control apparatus according to claim 1, wherein the regenerative torque of the motor/generator is a required value of the regenerative torque which increases with an increase of an amount of the braking operation by the operator of the vehicle, and the rate of change of the regenerative torque is a rate of change of the required value of the regenerative torque.

4. The control apparatus according to claim 1, wherein the mechanically operated transmission mechanism is a step-variable automatic transmission which is shifted to a selected one of a plurality of speed positions with an engaging action of a selected one of a plurality of coupling devices.

5. The control apparatus according to claim 4, wherein the predetermined range of the rate of change of the regenerative torque of the motor/generator is predetermined for each of the speed positions of the step-variable automatic transmission.

6. The control apparatus according to claim 1, wherein the vehicle is further provided with an engine also functioning as the drive power source, and an electrically controlled transmission mechanism having a differential mechanism to which the engine is operatively connected in a power transmittable manner, and a first motor/generator operatively connected to the differential mechanism in a power transmittable manner, a differential state of the electrically controlled transmission mechanism being controlled by controlling an operating state of the first motor/generator,
and wherein the motor/generator generating the regenerative torque is a second motor/generator operatively connected to an output rotary member of the electrically controlled transmission mechanism in a power transmittable manner.

7. The control apparatus according to claim 1, wherein the processor initiates the shift-down action of the mechanically operated transmission mechanism in response to the rate of change of the regenerative torque having been held within the predetermined range for at least the predetermined length of time.

* * * * *